(12) United States Patent
Caraccio et al.

(10) Patent No.: US 12,079,513 B2
(45) Date of Patent: Sep. 3, 2024

(54) LOG MANAGEMENT MAINTENANCE OPERATION AND COMMAND

(71) Applicant: Micron Technology, Inc., Boise, ID (US)

(72) Inventors: Danilo Caraccio, Milan (IT); Paolo Amato, Treviglio (IT); Daniele Balluchi, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 143 days.

(21) Appl. No.: 17/657,870

(22) Filed: Apr. 4, 2022

(65) Prior Publication Data

US 2022/0326887 A1  Oct. 13, 2022

Related U.S. Application Data

(60) Provisional application No. 63/171,370, filed on Apr. 6, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0619* (2013.01); *G06F 3/0679* (2013.01)

(58) Field of Classification Search
CPC .... G06F 3/0659; G06F 3/0604; G06F 3/0619; G06F 3/0679; G06F 3/061;

(Continued)

(56) References Cited

U.S. PATENT DOCUMENTS

2005/0273548 A1  12/2005  Roohparvar
2010/0064203 A1*  3/2010  Aihara ................ G06F 11/0775
                                                           714/799

(Continued)

FOREIGN PATENT DOCUMENTS

CN          111143104 A       5/2020

OTHER PUBLICATIONS

GeeksforGeeks, "Interrupts," https://www.geeksforgeeks.org/interrupts/.*

(Continued)

*Primary Examiner* — Tracy A Warren
(74) *Attorney, Agent, or Firm* — Holland & Hart LLP

(57) ABSTRACT

Methods, systems, and devices for log management maintenance operation and command are described. A method may include receiving, at a memory system, a command associated with maintenance for the memory system and indicating to initiate collecting values of a parameter, storing a value of the parameter, and transmitting, to a host system, a message indicating an availability of the value of the parameter based at least in part on storing the value of the parameter. An additional method may include transmitting, to a host system, a message indicating that a quantity of errors for an address of an address space associated with the memory system satisfies a threshold, receiving a command associated with maintenance for the memory system and indicating a retirement of the address, and retiring the address for the address space associated with the memory system based at least in part on receiving the command.

23 Claims, 16 Drawing Sheets

(58) Field of Classification Search
CPC ............. G06F 11/0703; G06F 11/0727; G06F 11/0751; G06F 11/0754; G06F 11/076; G06F 11/0766
See application file for complete search history.

(56) References Cited

U.S. PATENT DOCUMENTS

| | | |
|---|---|---|
| 2012/0023365 A1 | 1/2012 | Byom et al. |
| 2015/0348599 A1 | 12/2015 | Mirichigni et al. |
| 2017/0024266 A1* | 1/2017 | Iwai .................... G06F 11/3656 |
| 2020/0201752 A1 | 6/2020 | Palmer |
| 2020/0310968 A1* | 10/2020 | Kim .................... G06F 12/0246 |
| 2021/0103495 A1* | 4/2021 | Kim .................... G06F 11/3037 |
| 2021/0405911 A1* | 12/2021 | Navon .................. G06F 3/0646 |
| 2022/0188212 A1* | 6/2022 | Lavrentiev ............... G06N 5/02 |
| 2022/0200968 A1* | 6/2022 | Helmick ............... H04L 9/0825 |

OTHER PUBLICATIONS

Fechser, David A., "Making interrupt design firmware friendly," EETimes, 2022.*

"International Search Report and Written Opinion of the International Searching Authority," issued in connection with Int'l Appl. No. PCT/US2022/071551 dated Jul. 13, 2022 (11 pages).

* cited by examiner

LOG MANAGEMENT MAINTENANCE OPERATION AND COMMAND

CROSS REFERENCE

The present application for patent claims the benefit of U.S. Provisional Patent Application No. 63/171,370 by CARACCIO et al., entitled "LOG MANAGEMENT MAINTENANCE OPERATION AND COMMAND," filed Apr. 6, 2021, which is assigned to the assignee hereof, and which is expressly incorporated by reference in its entirety herein.

FIELD OF TECHNOLOGY

The following relates generally to one or more systems for memory and more specifically to log management maintenance operation and command.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
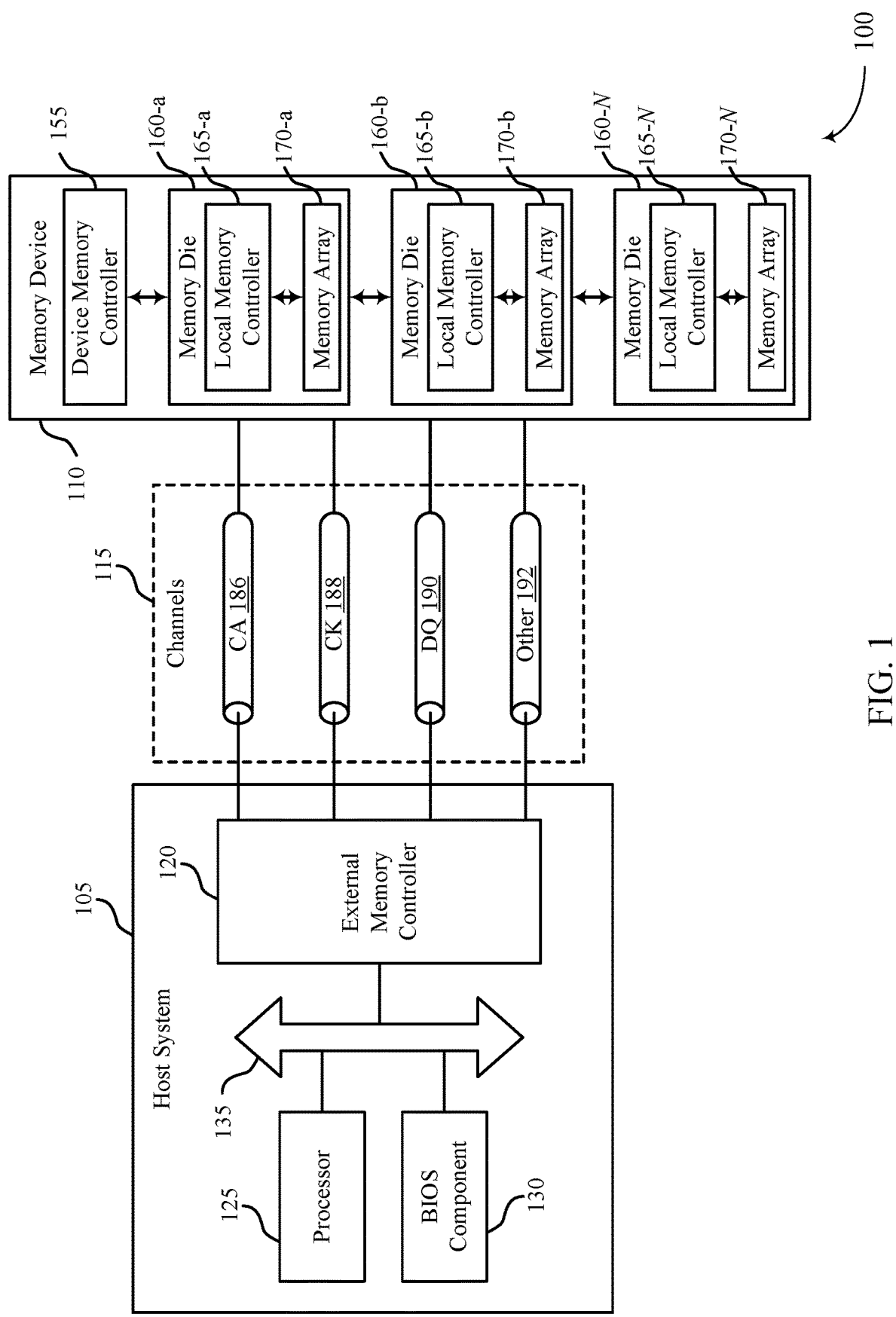
FIG. 1 illustrates an example of a system that supports log management maintenance operation and command in accordance with examples as disclosed herein.

A system may include a host system and a memory system that stores data for the host system. In some examples, the memory system may include multiple memory devices (e.g., memory dies or memory chips) coupled with a memory system controller. For example, the memory system controller may perform operations on the memory devices and communicate information or commands with the host system. In some cases, the memory system may need to perform maintenance operations such as telemetry or address management. In some cases, the memory management techniques may lack commands or protocols between a memory system and a host system for managing maintenance operations. For example, a memory system that is an example of a compute express link (CXL) interface may have a command structure that includes command sets and opcodes within the command sets. However, the interface may lack or not support maintenance operations for the memory devices.

Systems, techniques, and devices are described herein for a host system and a memory system configured according to a shared protocol that supports enhanced management of maintenance operations between the host system and memory system. For example, the shared protocol may include an expansion of a "start maintenance" command within an "events" command set. Specifically, the host system may transmit a "maintenance" command that specifies a maintenance operation type such as to perform telemetry collection or address management. In some examples, telemetry collection may be associated with collecting a parameter associated with a memory system controller, a performance metric of the memory system, a reliability metric of the memory system, or any other type of metric. For example, the host system may transmit a maintenance command "start telemetry" to initiate telemetry collection and read the telemetry data with a maintenance command "read telemetry." The host system may also transmit a maintenance command "stop telemetry" to terminate the telemetry collection. In other examples, the host system may transmit a maintenance command to perform address management (e.g., retire a memory address). For example, the host system may retire a memory address associated with a quantity of errors exceeding a threshold. In such examples, the memory system may retire the address and refrain from monitoring error rates for the address or send any notifications (e.g., event records, interrupts) to the host based on the memory address.

By supporting these and other techniques related to the management of maintenance operations between a host system and memory system, a system may provide various improvements to operation of the host system and memory system. For example, the described techniques may support more-reliable operation, prioritization among operations (e.g., prioritizing access operations versus maintenance operations), more efficient operation (e.g., delaying or canceling maintenance operations, retiring memory addresses that are no longer reliable), reduced latency, or improved throughput, among other benefits compared with other memory techniques.

Features of the disclosure are initially described in the context of systems and dies as described with reference to FIGS. 1 and 2. Features of the disclosure are described in the context of process flows as described with reference to FIGS. 3-8. These and other features of the disclosure are further illustrated by and described with reference to an apparatus diagram and flowcharts that relate to log management maintenance operation and command as described with reference to FIGS. 9-16.

FIG. 1 illustrates an example of a system 100 that supports log management maintenance operation and command in accordance with examples as disclosed herein. The system 100 may include a host system 105, a memory device 110, and a plurality of channels 115 coupling the host system 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host system 105. The host system 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host system 105 may refer to the hardware, firmware, software, or a combination thereof that implements the functions of an external memory controller 120. In some examples, the external memory controller 120 may be referred to as a host or a host system 105.

A memory device 110 may be an independent device or a component that is operable to provide physical memory addresses/space that may be used or referenced by the system 100. In some examples, a memory device 110 may be configurable to work with one or more different types of host devices. Signaling between the host system 105 and the memory device 110 may be operable to support one or more of: modulation schemes to modulate the signals, various pin configurations for communicating the signals, various form factors for physical packaging of the host system 105 and the memory device 110, clock signaling and synchronization between the host system 105 and the memory device 110, timing conventions, or other factors.

The memory device 110 may be operable to store data for the components of the host system 105. In some examples, the memory device 110 may act as a secondary-type or dependent-type device to the host system 105 (e.g., responding to and executing commands provided by the host system 105 through the external memory controller 120). Such commands may include one or more of a write command for a write operation, a read command for a read operation, a refresh command for a refresh operation, or other commands.

The host system 105 may include one or more of an external memory controller 120, a processor 125, a basic input/output system (BIOS) component 130, or other components such as one or more peripheral components or one or more input/output controllers. The components of the host system 105 may be coupled with one another using a bus 135.

The processor 125 may be operable to provide control or other functionality for at least portions of the system 100 or at least portions of the host system 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host system 105. The BIOS component 130 may also manage data flow between the processor 125 and the various components of the system 100 or the host system 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host system 105. For example, the memory device 110 may receive a write command indicating that the memory device 110 is to store data for the host system 105 or a read command indicating that the memory device 110 is to provide data stored in a memory die 160 to the host system 105.

A local memory controller 165 (e.g., local to a memory die 160) may include circuits, logic, components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host system 105 (e.g., the processor 125) and the memory device 110. The external memory controller 120 may convert or translate communications exchanged between the components of the host system 105 and the memory device 110. In some examples, the external memory controller 120 or other component of the system 100 or the host system 105, or its functions described herein, may be implemented by the processor 125. For example, the external memory controller 120 may be hardware, firmware, or software, or some combination thereof implemented by the processor 125 or other component of the system 100 or the host system 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host system 105 may exchange information with the memory device 110 using one or more channels 115. The channels 115 may be operable to support communications between the external memory controller 120 and the memory device 110. Each channel 115 may be examples of transmission mediums that carry information between the host system 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host system 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host system 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, data channels 190 may be operable to communicate one or more of data or control information between the host system 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, an interface between the host system 105 and the memory system 110 may support operations or communications according to a Compute Express Link (CXL) standard, or other protocol that may specify a relatively low-latency, high bandwidth discrete or on-package link that supports dynamic protocol multiplexing of coherency, memory access, or I/O protocols. In some examples, a memory system 110 in accordance with such protocols may include host-managed device memory (HDM), which may refer to device-attached memory mapped to a system-coherent address space and accessible to the host system 105 using standard write-back semantics. In some examples, a memory system 110 in accordance with such protocols may include private device memory (PDM), which may refer to device-attached memory that is not mapped to system address space or directly accessible to the host system 105 as cacheable memory (e.g., as in some PCIe devices). In some examples, such protocols may support using an accelerator to access system memory as a caching agent or host system memory, where an accelerator may include devices that may be used by software running on processors of the host system 105 to offload or perform computation or I/O tasks. Examples of accelerators may include programmable agents (e.g., a GPU, a GPCPU), fixed-function agents, or reconfigurable agents such as FPGAs.

In some examples, memory systems 110 may refer to devices that include memory (e.g., double data rate (DDR) memory, high bandwidth memory (HBM), memory dies 160) attached to the device (e.g., a Type 2 Device according to a CXL protocol). Such devices may execute against memory but their performance may involve relatively high bandwidth between an accelerator and the device-attached memory. A goal for some memory protocols may be to provide a means for the host system 105 to push operands into the memory system 110 (e.g., device-attached memory) and for the host system 105 to pull results out of the memory system 110 in a manner that avoids software and hardware cost that might offset benefits of an accelerator. In some examples, such coherent-address device-attached memory may be referred to as HDM.

In some examples, memory systems 110 may refer to a device without an active computation engine, and may be configured as a memory expander for a host system 105 (e.g., a Type 3 Device according to a CXL protocol). In some examples, such a configuration may not involve an accelerator, and the device may not transmit any requests over an agency coherence protocol that supports device caching of host memory (e.g., over a CXL.cache). Rather, in some examples, such a configuration may operate primarily over a memory access protocol that supports device-attached memory (e.g., over a CXL.mem). Such an architecture may be independent of memory technology and may allow for a range of memory organization techniques depending on support implemented in a host system 105.

In some examples, a host system 105, a memory system 110, or both may support various protocols for addressing and address translations. For example, a host physical address (HPA) may be used to communicate a logical address between a host system 105 and a memory system 110 (e.g., an address included in commands from the host system 105). In some examples, a device physical address (DPA) may be an address decoded by a memory system 110 at a host-managed device memory (HDM) decoder of the memory system 110, where such a decoding may start from a received HPA (e.g., when decoding an HPA in a command from the host system 105). At a memory system 110, a DPA may refer to a logical address that is mapped to a physical address (e.g., a channel, rank, bank, bank group, row, or column), which may be a mapping according to a logical-to-physical (L2P) mapping or L2P table at the memory system 110, and may further include a mapping to a particular memory die 160 of the memory system 110 (e.g., of a plurality of memory dies 160 of the memory system 110). The DPA may refer to a contiguous address space of the memory system 110.

In some examples, the system 100 may include a switch that includes a further HDM decoder. Such a switch may refer to a component of a host system 105, or a component between a host system 105 and one or more memory systems 110, that may support various memory interleaving techniques. For example, memory interleaving via a switch with an HDM decoder may support consecutive memory addresses from the perspective of the host system 105 being mapped to different memory systems 110 (e.g., consecutive HPAs, which may be mapped at a uniform interval). At each of a set of interleaved memory systems 110, the respective memory system 110 may convert an HPA from the switch, into a DPA at the respective memory system 110.

In some examples, on-field or in-operation maintenance actions may be needed to resolve errors at a memory system 110, which may include operations such as post-package repair (PPR), address management (e.g., retiring memory addresses), or collecting telemetry data at the memory system 110. However, some memory management techniques may lack commands, protocols, or handshaking between a memory system 110 and a host system 105 for managing maintenance operations to resolve such error conditions or initiate such maintenance operations of a memory system 110. For example, a memory system 110 may be configured to store various event records (e.g., in a mode register of the memory system), such as a general media event record, a DRAM event record, a memory module event record, or a vendor-specific event record, or various combinations thereof. However, such event records may lack a prescription of actions by a host system 105 when a maintenance flag is raised, or may lack an indication to a host system 105 that a memory system 110 is requesting or has initiated maintenance operations.

In accordance with examples as disclosed herein, a host system 105 and a memory system 110 may be configured according to a shared protocol that supports enhanced management of maintenance operations between the host system 105 and memory system 110, such as maintenance operations to resolve error conditions at a physical address of a memory system 110 (e.g., at a physical address of a memory die 160 of the memory system 110). In some examples, the described techniques may support a memory system 110 initiating maintenance operations based on detections performed at the memory system 110. The memory system 110 may provide a maintenance indication for a host system 105, which may include a request to perform a maintenance operation (e.g., requesting permission from the host system 105, requesting an explicit maintenance command from the host system 105 to initiate a maintenance operation) or an indication that the memory system 110 is proceeding with a maintenance operation. In some examples, the described techniques may support a host system 105 initiating maintenance operations based on detections performed at the host system 105. In various examples, the described maintenance signaling may include capability signaling between a host system 105 and a memory system 110, status indications between a host system 105 and a memory system 110, and other maintenance management techniques. For example, the host system 105 may initiate PPR, address management, or telemetry collection operations by transmitting a maintenance command to the memory system 110.

By supporting these and other techniques related to the management of maintenance operations between a host system 105 and memory system 110, the system 100 may provide various improvements to operation of the host system 105 and the memory system 110. For example, the described techniques may support more-reliable operation, prioritization among operations (e.g., prioritizing access operations versus maintenance operations), more efficient operation (e.g., delaying or canceling maintenance operations, retiring memory addresses that are no longer needed), reduced latency, or improved throughput, among other benefits compared with other memory techniques.

Figure 2:
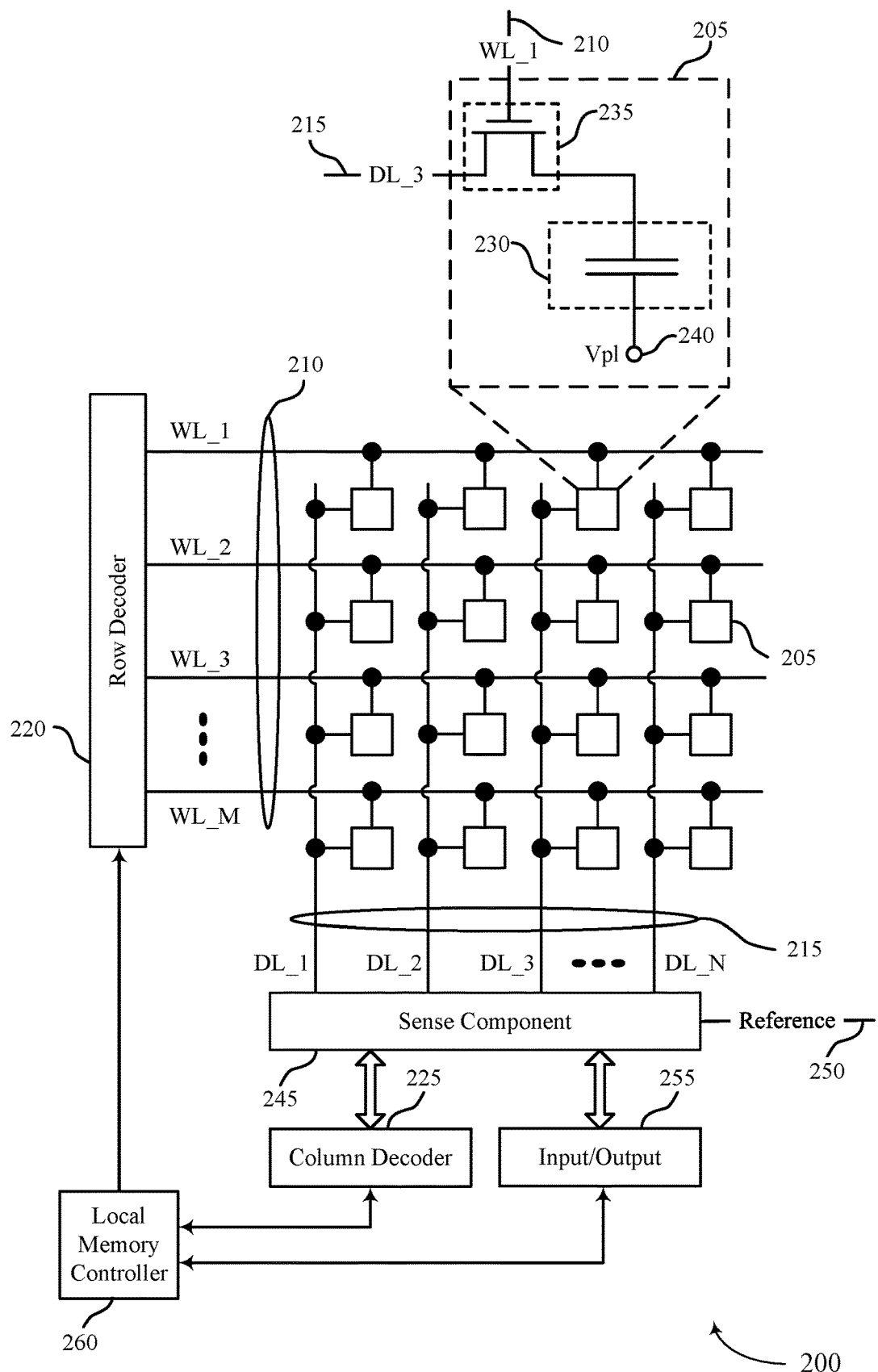
FIG. 2 illustrates an example of a memory die that supports log management maintenance operation and command in accordance with examples as disclosed herein.

FIG. 2 illustrates an example of a memory die 200 that supports log management maintenance operation and command in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host system 105, another controller associated with the memory die 200), translate the commands or the data (or both) into information that can be used by the memory die 200, perform one or more operations on the memory die 200, and communicate data from the memory die 200 to a host system 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host system 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

In some examples, a memory system 110 that includes the memory die 200 may be configured according to a shared protocol that supports enhanced management of maintenance operations between the memory system 110 and a host system coupled with the memory system 110, such as maintenance operations to resolve error conditions at a physical address of the memory die 200 (e.g., PPR operations or address management operations) or initiate the collection of telemetry data at the memory die 200. In some examples, such maintenance operations may include performing a post-package repair on the memory die 200. For example, the memory die 200 may be configured to remap one or more addresses (e.g., rows, columns) to a different portion of a memory array of the memory die 200, or otherwise mapping or enabling different memory cells 205 of the memory die. In some examples, the memory die 200 may be configured to remap access operations to utilize different components or circuitry of the memory die 200, such as remapping operations to utilize a different (e.g., redundant) row decoder 220, column decoder 225, sense component 245, I/O component 255, local memory controller 260, or various components thereof or various combinations thereof. Such remapping may be performed by way of a logical reconfiguration (e.g., at the local memory controller) or by way of a physical reconfiguration (e.g., via a switching component, via a fuse or anti-fuse). In some examples, a post-package repair may be associated with a memory system 110 disabling or idling a first memory die 200, and remapping access operations to a second, different memory die 200 (e.g., of the same memory system 110).

In other examples, such maintenance operations may include retiring a memory address associated with a quantity of errors that satisfies a threshold. For example, an address of the memory die 200 may include a quantity of uncorrectable or correctable errors. In some examples, the memory die 200 may transfer data and an indication that the quantity of errors satisfies the threshold to a memory system controller (e.g., memory system controller 155 as described with reference to FIG. 1). In such examples, the memory system controller may notify the host system and receive a maintenance command indicating a retirement of the memory address associated with the quantity of errors. In such examples, the memory system may retire the address and refrain from monitoring error rates for the address or send any notifications (e.g., event records, interrupts) to the host system based on the memory address. In other examples, such maintenance operations may include collecting telemetry data, reading telemetry data, or stopping the collection of telemetry data. For example, the memory die 200 may store a value of a parameter after an event (e.g., after transferring data) to collect telemetry data. In such examples, the memory die 200 may read the value out to the memory system controller based on a Read Telemetry command issued by the host system.

Figure 3:
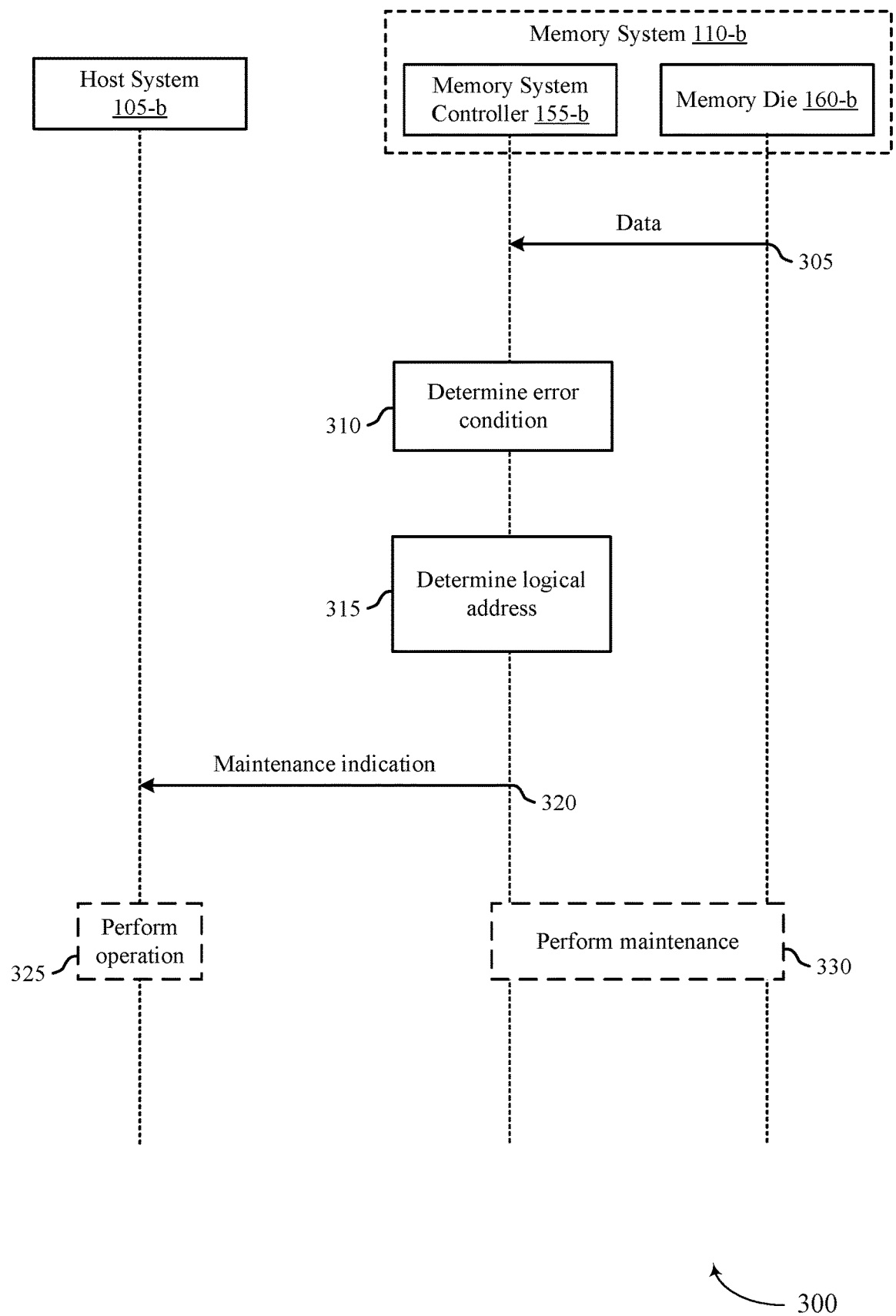
FIGS. 3 through 8 illustrate examples of process flows that support log management maintenance operation and command in accordance with examples as disclosed herein.

FIG. 3 illustrates an example of a process flow 300 that supports log management maintenance operation and command in accordance with examples as disclosed herein. The process flow 300 is described with reference to a host system 105-b and a memory system 110-b, which may be physically or operatively coupled via an interface (e.g., via channels 115, according to a memory interface or memory protocol). The memory system 110-b may include a memory system controller 155-b and a memory die 160-b. Although the memory system 110-b is illustrated with one memory die 160, a memory system 110 in accordance with aspects of the process flow 300 may include any quantity of memory dies 160. Further, although the host system 105-b is illustrated as being coupled with one memory system 110, a host system 105 in accordance with aspects of the process flow 300 may be coupled with any quantity of memory systems 110. The process flow 300 may illustrate aspects of a memory-initiated maintenance in accordance with examples as disclosed herein.

At 305, the memory system 110-b (e.g., the memory system controller 155-b) may receive data from the memory die 160-b. In some examples, the data may be received by accessing one or more memory cells 205 of the memory die 160-b, which may be responsive to a command from the host system 105-b (e.g., a read command received by the memory system controller 155-b and processed to access the memory die 160-b), or may be responsive to other accessing within the memory system 110-b (e.g., related to memory management techniques of the memory system 110-b, not responsive to a command from the host system 105-b).

At 310, the memory system 110-b (e.g., the memory system controller 155-b) may determine an error condition associated with a physical address of the memory die 160-b. For example, the memory system controller 155-b may determine that a quantity of errors in the data of 305 satisfies a threshold, or that a rate of errors in the data of 305 satisfies a threshold. In some examples, the quantity of errors may be associated with correctable errors in the memory system 110-b—e.g., the memory system controller 155-b may determine the quantity of errors received to be correctable. In other examples, the quantity of errors may be associated with uncorrectable errors in the memory system 110-b—e.g., the memory system controller 155-b may determine the quantity of errors received as uncorrectable. Additionally or alternatively, the memory system controller 155-b may determine an availability of a value of a parameter stored at the memory die 160-b based on receiving the data from the memory die 160-b. For example, the memory system controller 155-b may receive the value of the parameter when receiving the data in response to a previous "Start Telemetry" command issued by the host system 105-b as described with reference to FIG. 7.

At 315, the memory system 110-b (e.g., the memory system controller 155-b) may determine a logical address associated with the data of 305 (e.g., corresponding to the physical address of the memory die 160-b). In some examples, the memory system 110-b may determine a DPA (e.g., according to an L2P mapping of the memory system 110-b), or an HPA (e.g., according to an HDM decoder of the memory system 110-b), or both.

At 320, the memory system 110-b (e.g., the memory system controller 155-b) may transmit a maintenance indication to the host system 105-b (e.g., an indication of a maintenance operation for repairing the physical address of the memory die 160-*b*). Transmitting the maintenance indication of 320 may be based at least in part on determining the error condition (e.g., at 310), determining the logical address associated with the data of 305 (e.g., at 315), or determining the availability of the value of the parameter, or any combination thereof. In some examples, the maintenance indication of 320 may include an indication that the memory system 110-*b* is or will be performing a maintenance operation. In some examples, the maintenance indication of 320 may include a request to perform a maintenance operation (e.g., requesting permission or an explicit command from the host system 105-*b*).

In some examples, at 325, the host system 105-*b* may perform an operation based on receiving the maintenance indication of 320. In some examples, the host system 105-*b* may issue a command (e.g., to the memory system 110-*b*) to perform a maintenance operation or to refrain from performing a maintenance operation. In some examples, the host system 105-*b* may indicate to the memory system 110-*b* that data associated with the indicated address may be purged, or that an address may be retired based on the quantity of errors satisfies or exceeds the threshold. In other examples, the host system 105-*b* may indicate to the memory system 110-*b* to start collecting telemetry data, stop collecting telemetry data, or read telemetry data. In some examples, the telemetry data may be associated with values of a parameter of the memory system 110-*b*. For example, the parameter may be associated with the memory system controller 155-*b*, a performance metric of the memory system 110-*b* (e.g., data transfer speed, read/write speed, power consumption, etc.), a reliability metric of the memory system 110-*b* (e.g., a quantity of errors, quantity of ECC operations performed, etc.), or any other type of metric thereof. The memory system 110-*b* may store a value of the parameter based on determining an event associated with the parameter—e.g., based on measuring a data transfer rate. That is, the memory system 110-*b* may store a value after an event that corresponds to a change in the parameter, an operation associated with the parameter, or an expiration of a time period In some examples, at 330, the memory system 110-*b* may perform a maintenance operation. For example, the memory system 110-*b* (e.g., the memory system controller 155-*b*) may initiate a post-package repair on the memory die 160-*b*. In various examples, performing the maintenance operation of 330 may be based on determining the error condition (e.g., at 310), or an operation performed by the host system 105-*b* (e.g., at 325), such as a transmission of a maintenance command by the host system 105-*b*. In other examples, the memory system 110-*b* may initiate the collection of values of the parameter, stop the collection of values of the parameter, or read the collection of values of the parameter. Additionally or alternatively, the memory system 110 may retire a memory address based on determining the error condition (e.g., at 310), or an operation performed by the host system 105-*b* (e.g., at 325), such as a transmission of a maintenance command by the host system 105-*b*. For example, the memory system 110-*b* may retire the memory address and refrain from monitoring error rates for the address or send any notifications (e.g., event records, interrupts) to the host system 105-*b* based on the error condition or maintenance command issued by the host system 105-*b*.

Although described in the context of maintenance performed on an identified physical address of the memory die 160-*b* (e.g., associated with an error of the physical address), the described techniques can be understood to be extended to additional circumstances. For example, the memory system 110-*b* may identify a need for maintenance that is not directly or strictly related to or limited to a physical address of the memory die 160-*b* detected to have an error. Such maintenance may be more-generally related to storage medium of the memory die 160-*b*, and may be triggered by one or more other conditions. In such examples, the maintenance indication of 320 may omit an indication of an address (e.g., not include an indication of an HPA, DPA, or other address).

Figure 4:
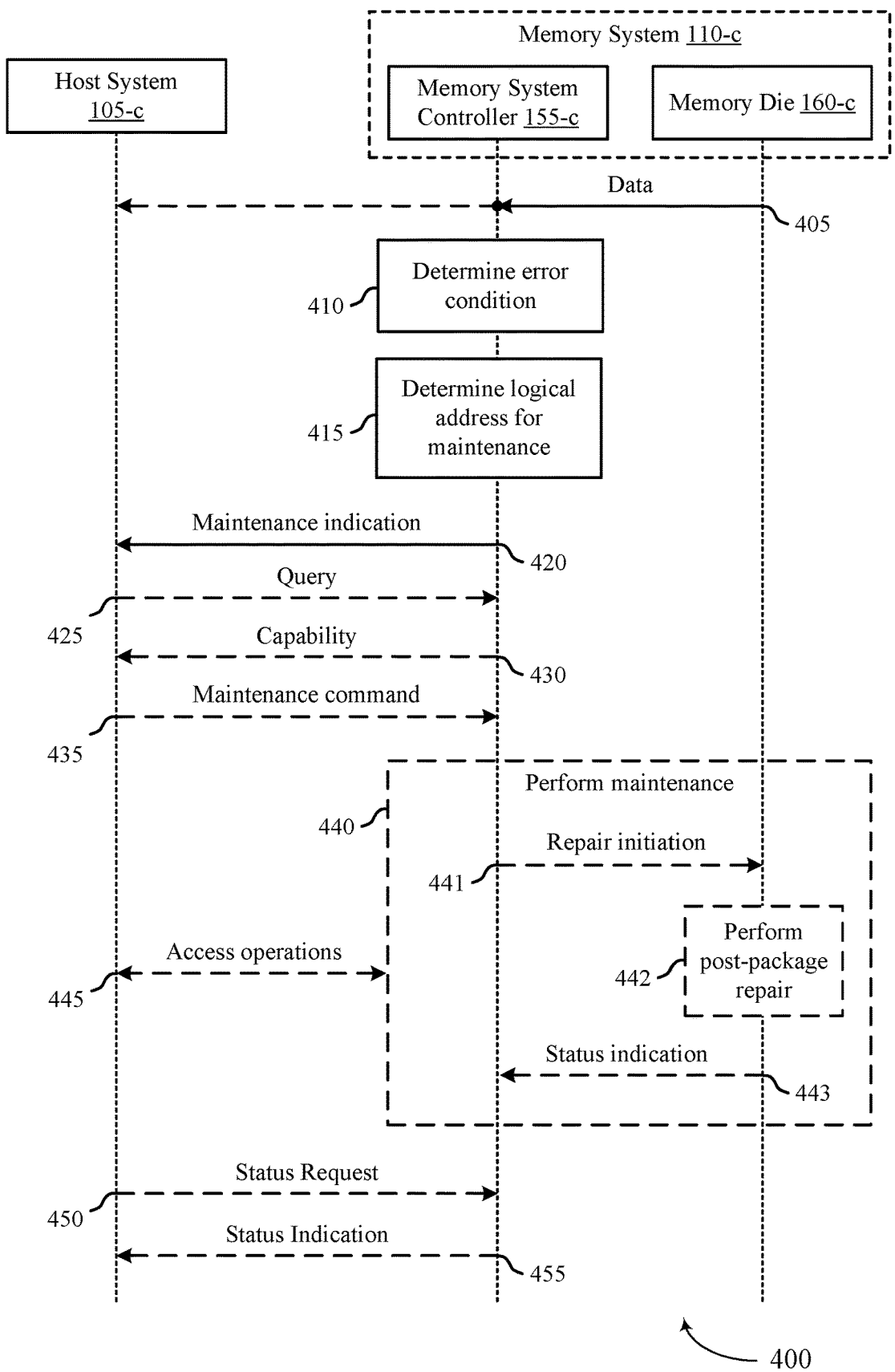

FIG. 4 illustrates an example of a process flow 400 that supports log management maintenance operation and command in accordance with examples as disclosed herein. The process flow 400 is described with reference to a host system 105-*c* and a memory system 110-*c*, which may be physically or operatively coupled via an interface (e.g., via channels 115, according to a memory interface or memory protocol). The memory system 110-*c* may include a memory system controller 155-*c* and a memory die 160-*c*. Although the memory system 110-*c* is illustrated with one memory die 160, a memory system 110 in accordance with aspects of the process flow 400 may include any quantity of memory dies 160. Further, although the host system 105-*c* is illustrated as being coupled with one memory system 110, a host system 105 in accordance with aspects of the process flow 400 may be coupled with any quantity of memory systems 110.

The process flow 400 may illustrate aspects of a memory-initiated maintenance in accordance with examples as disclosed herein. The process flow 400 and related descriptions may include various enhancements to a Module Event Record (e.g., a Memory Module Event Record of an Event Record of the memory system 110-*c*), which may include adding various information related to maintenance. The process flow 400 and related descriptions may also illustrate implementations of a dedicated command set in a Memory Device Command interface to manage maintenance operations, including examples of capability indications, status indications, and registers for such management.

At 405, the memory system 110-*c* (e.g., the memory system controller 155-*c*) may receive data from the memory die 160-*c*. In some examples, the data may be received by accessing one or more memory cells 205 of the memory die 160-*c*. In some examples, the receipt of data at the memory system controller 155-*c* may be responsive to a command from the host system 105-*c* (e.g., a read command received by the memory system controller 155-*c* and processed to access the memory die 160-*c*) and, in some examples, the data received from the memory die 160-*c* may be forwarded to the host system 105-*c*. In some examples, the receipt of data at the memory system controller 155-*c* may be responsive to other accessing within the memory system 110-*c* (e.g., related to memory management techniques of the memory system 110-*c*, not responsive to a command from the host system 105-*c*) and, in some examples, such data may not be forwarded to the host system 105-*c*.

At 410, the memory system 110-*c* (e.g., the memory system controller 155-*c*) may determine an error condition associated with a physical address of the memory die 160-*c*. For example, the memory system controller 155-*c* may determine that a quantity of errors in the data of 405 satisfies a threshold, or that a rate of errors in the data of 405 satisfies a threshold, or that some threshold amount of errors or data poison (e.g., indication that a number of errors satisfies a threshold, code indicating erroneous data) are otherwise present in the data of 405. In some examples, based at least in part on determining the error condition (e.g., that a quantity or proportion or errors satisfies a threshold), the memory system 110-*c* (e.g., the memory system controller 155-c) may determine to initiate or execute internal maintenance operations (e.g., to perform the maintenance of 440). In other examples, the memory system 110-c may determine an availability of a value of a parameter based on a previous maintenance command associated with "Start Telemetry."

At 415, the memory system 110-c (e.g., the memory system controller 155-c) may determine a logical address associated with the data of 405 (e.g., corresponding to the physical address of the memory die 160-c). In some examples, the memory system 110-c may determine a DPA (e.g., according to an L2P mapping of the memory system 110-c), or an HPA (e.g., according to an HDM decoder of the memory system 110-c), or both.

At 420, the memory system 110-c (e.g., the memory system controller 155-c) may transmit or otherwise convey a maintenance indication to the host system 105-c (e.g., an indication of a maintenance operation for repairing the physical address of the memory die 160-c, an indication of a memory event). Transmitting the maintenance indication of 420 may be based at least in part on determining the error condition (e.g., at 410), determining the logical address associated with the data of 405 (e.g., at 415), determining the availability of the value of the parameter, or any combination thereof. In various examples, the maintenance indication of 420 may be implemented as an interrupt by the memory system 110-c, as a response to the host system 105-c polling a dedicated register of the memory system 110-c, or through a transaction issued by the memory system 110-c. The maintenance indication of 420 may include an indication of a maintenance operation type, or an address of the memory system 110-c (e.g., an HPA, a DPA), or both.

In some examples, the maintenance indication of 420 may include an indication that the memory system 110-c is or will be performing a maintenance operation (e.g., performing a memory-initiated maintenance operation, without receiving or waiting for an explicit maintenance command from the host system 105-c). For example, the memory system 110-c may identify that an internal maintenance operation is needed, and the memory system 110-a may report a maintenance event to the host system 105-c. In some examples, the maintenance event may be associated with a telemetry operation, an address management operation, or a post-package repair.

In some examples, the maintenance indication of 420 may include a request to perform a maintenance operation (e.g., requesting permission or an explicit command from the host system 105-c). In examples where the maintenance indication of 420 is associated with such a request, the memory system 110-c may wait for a response from the host system 105-c prior to performing a maintenance operation.

TABLE 1A

Memory Module Event Record

| Byte offset | Length | Field | Description |
| --- | --- | --- | --- |
| 00h | 10h | Event Record Identifier | xx . . . xxh |
| 10h | 20h | Common event record | Event Record Length Event Record Flags (See Table 2) Event Record Handle Related Event Record Handle Event Record Timestamp |
| 30h | 1h | Device Event Type | 00h (Health Status Change) |
| 31h | 12h | Device Health Information | Maintenance Needed (byte 49:01h) |

TABLE 1A-continued

Memory Module Event Record

| Byte offset | Length | Field | Description |
| --- | --- | --- | --- |
| 43h | 1h | Maintenance Operation | 00h: no operation 01h: Memory module repair Other: reserved |
| 44h | 8h | Address (e.g., DPA, HPA) | Target address for the repair |
| 4Bh | 35h | Reserved | [. . .] |

TABLE 1B

DRAM Event Record

| Byte offset | Length | Description |
| --- | --- | --- |
| 00h | 10h | Event Record Identifier |
| 10h | 1 | Event Record Length |
| 11h | 3 | Event Flag Records (See Table 2) |
| 14h | 2 | Event Record Handle |
| 18h | 8 | Event Record Timestamp |
| 20h | 1 | Maintenance Operation Type: Indicates the maintenance operation the memory system 110-c requests to initiate |
| 21h | Fh | Reserved |
| 30h | 8 | Physical Address: The physical address that the memory event occurred Bit[0]: Volatile Bit[1]: DPA not repairable Bits [5:2]: Reserved Bits [7:6]: DPA [7:6] Bits [15:8]: DPA [15; 8] . . . Bits [63:56]: DPA[63:56] |

Table 1A and 1B illustrate examples of a memory module event record or DRAM event record that may support signaling the maintenance indication of 420. In some examples, a memory module event record or event record may be implemented as a register at the memory system 110-c (e.g., of the memory system controller 155-c), which may be polled by the host system 105-c. In some examples, a similar or alternative event record as shown in Table 1B may be implemented at the memory die 160-c (e.g., as a DRAM event record). The memory module event record may include a Device Health Information field that may indicate whether maintenance is needed at the memory system 110-a. The memory module event record may also include a Maintenance Operation field indicating various details of the maintenance operation, such as a maintenance operation type. In some examples, a value of 00h may indicate "no operation" which may indicate an unrepairable portion of the memory system 110-c, or that a location of the memory system 110-c is not repairable due to, for example, a lack of maintenance resources, or that a maintenance operation selection may be performed by the host system 105-c. In some examples, an Address field may be used to indicate an address of the detected error, such as a DPA, an HPA, or a physical address of the memory system 110-c (e.g., of the memory die 160-c), though an address may be omitted in the event that a more-general maintenance is being indicated (e.g., maintenance more generally related to a storage medium of the memory die 160-c). In some examples, one or more fields of the memory module event record may be provisioned to support a generic parameter, or be redefined for other applications. Table 1B may illustrate an alternative DRAM event record. For example, the DRAM event record may include similar fields including the event record identifier, event record length, event record flags, event record handle, related event record handle, or event record time stamp. The Table 1B may also illustrate a maintenance operation type. In some examples, if the memory system 110-c does not have a request for a maintenance operation, this field may be zero (0). In other examples, the memory system 110-c may indicate the type of maintenance operation (e.g., one of PPR, address management, telemetry) to the host system 105-c. Table 1B may also illustrate the physical address of the error condition. In some examples, the Table 1B may indicate if the error is correctable or not (e.g., if the error is repairable). Table 2 illustrates an example of event record flags that may be implemented in the Common Event Record field of the memory module event record, such as a "Maintenance Needed" field that the memory system 110-c may use for the maintenance indication of 420.

TABLE 2

Event Record Flags

| Bits | Description |
|------|-------------|
| 1:0 | Event Record Severity |
| 2 | Permanent Condition |
| 3 | Maintenance Needed |
| 4 | Performance Degraded |
| 5 | Hardware Replacement Needed |
| 23:6 | Reserved |

In some examples, the event record severity may indicate the severity of the event. For example, the event record severity may indicate if the event was information (e.g., with a 00h), a warning event (e.g., with a 01h), a failure event (e.g., with a 02h), or a fatal event (e.g., with a 03h). In some cases, the permanent condition of Table 2 may indicate if the event reported is a permanent—e.g., this bit may not be set when the event is an informational event. Performance degraded may indicate if the device is no longer operating at a threshold performance level. Hardware replacement may indicate if the device should be replaced.

In an example, for the maintenance indication of 420, the memory system 110-c may use a module event record given in Table 3 as a "maintenance needed" indication:

TABLE 3

Module Event Record for Maintenance Needed Indication

| Byte offset | Field | Value |
|-------------|-------|-------|
| 00h | Event Record Identifier | xx . . . xxh |
| 10h | Event Record Length | 80h |
| 11h | Event Record Flags | (See Table 4) |
| 14h | Event Record Handle | XXXXh |
| 16h | Related Event Record Handle | 0000h |
| 18h | Event Record Timestamp | xx . . . xxh |
| 20h | Reserved | 0 . . . 0h |
| 30h | Device Event Type | 00h (Health Status Change) |
| 31h | Device Health Information | Maintenance Needed (byte 49:01h) |
| 43h | Maintenance operation | 01h Memory module repair |
| 44h | HPA | XX . . . XXh |
| 4Bh | Reserved | 0 . . . 0h |

TABLE 4

Event Record Flags for Maintenance Needed Indication

| Bits | Description | Value |
|------|-------------|-------|
| 1:0 | Event Record Severity | 01b (warning) |
| 2 | Permanent Condition | 1b |
| 3 | Maintenance Needed | 1b |
| 4 | Performance Degraded | 0b |
| 5 | Hardware Replacement Needed | 0b |
| 23:6 | Reserved | Xx |

The host system 105-c may perform various operations based on receiving the maintenance indication of 420. For example, the host system 105-c may issue one or more signals or indications according to the Maintenance Command Set of Table 5:

TABLE 5

Maintenance Command Set

| Opcode | | | | Input | Output |
|--------|--|--|--|-------|--------|
| Command Set Bits [15:8] | Command Bits [7:0] | Combined Opcode | Required | Payload Size [B] | Payload Size [B] |
| 47h Maintenance Command | 00h Start Maintenance | 4700h | M | 0Ah | 0h |
| | 01h Get Maintenance Command Status | 4701h | M | 0Ah | 8h |
| | 02h Check Maintenance Resources | 4702h | M | 0Ah | 8h |

In some examples, the host system 105-c and the memory system 110-c may be configured to support various aspects of capability signaling relative to a maintenance operation (e.g., of 440). For example, at 425, the host system 105-c may transmit a query (e.g., using a Check Maintenance Resources field of the Maintenance Command Set) to the memory system 110-c to request an indication of a capability of the memory system 110-c for performing maintenance operations. The memory system 110-*c* may respond, at 430, with a capability indication. Such a capability indication may indicate a quantity of available repairs at the memory system 110-*c*, such as a quantity of swappable rows for a remapping operation, or some other quantity of redundant or otherwise available components. In some examples, such a capability indication may include a quantity of available maintenance operations organized or conveyed by maintenance operation type, or other maintenance parameters such as latencies or timeouts associated with each type of maintenance command supported by the memory system 110-*c*. In some examples, the query of 425 may include a query by the host system 105-*c* of whether a target address (e.g., a target DPA, a target HPA) is repairable. Although described in the context of a handshake or responsive signaling, in some examples, a capability indication of 430 may be signaled proactively (e.g., without a transmission or receipt of a query of 425). In some examples, capability signaling may be omitted, not configured, or otherwise not performed, in which case the operations of 425 and 430 may be omitted.

In some examples, the host system 105-*c* and the memory system 110-*c* may be configured to support various aspects of maintenance requests and responsive commands relative to the maintenance of 440. For example, when the maintenance indication of 420 includes a request by the memory system 110-*c* to perform a maintenance operation, at 435, the host system 105-*c* may transmit a responsive maintenance command, which may be an explicit command for the memory system 110-*c* to perform the maintenance operation of 440 (e.g., using a Start Maintenance field of the Maintenance Command Set). In some examples, a maintenance command of 435 may be an explicit command to start a maintenance operation on the target address (e.g., DPA, HPA) as indicated by the memory system 110-*c* itself. In some examples, the host system 105-*c* may select a responsive maintenance command from one of the following commands illustrated in Table 6:

TABLE 6

Maintenance Operation Type

| Maintenance Operation Type | | Maintenance Operation Method | |
|---|---|---|---|
| Value | Description | Value | Description |
| 00h | No operation | 00h | No Operation |
| 01h | DRAM PPR | 00h | Hard PPR |
| | | 01h | Soft PPR |
| | | Others | Reserved |
| 02h | Diagnostic Telemetry | 00h | Start Telemetry |
| | | 01h | Read Telemetry Data |
| | | 02h | Stop Telemetry Data |
| | | Others | Reserved |
| 03h | Address Management | 00h | Retire |
| | | Others | Reserved |
| 04h to DFh | Reserved | Others | Reserved |
| E0H to FFh | Vendor Specific | All | Reserved |

For example, the host system 105-*c* may be configured to transmit a maintenance command 435 that indicates whether to perform a maintenance operation (e.g., DRAM PPR, Telemetry, Address Management) and the method of the operation (e.g., Start Telemetry, Read Telemetry, or Stop Telemetry). In some examples, a maintenance request of 420 may indicate a type of maintenance operation, and the host system 105-*c* may evaluate whether to approve the requested maintenance operation, refuse the request maintenance operation, or issue a maintenance command for a different type of operation. For example, in response a request of 420, the host system 105-*c* may transmit a maintenance command to initiate a soft repair to minimize execution latency, or may transmit a command to refrain from performing the maintenance operation, or to retire an address from an address space (e.g., retiring an HPA or a DPA indicated in the maintenance indication of 420, such as when the addressed data is no longer needed). In other examples, the host system 105-*c* may transmit a maintenance command to initiate collection of telemetry data. In some examples, a maintenance command of 435 may be issued at a later time, based on a delay determined by the host system 105-*c*, or may specify a time for the memory system 110-*c* to perform a maintenance operation. In some examples, such a request of the maintenance indication of 420 may be in accordance with Start Maintenance Input Parameters, such as those given in Table 7.

TABLE 7

Start Maintenance Input Parameters

| Bytes | Description |
|---|---|
| 0 | Action: Specifies the maintenance operation (e.g., soft PPR hard PPR)<br>00h = Memory module repair 0 (fast repair operation)<br>01h = Memory module repair 1 (long repair operation)<br>Other values reserved. |
| 1 | Maintenance Interrupt Settings: When enabled, the device shall signal an interrupt when maintenance operation completes.<br>Bits[1:0]: Interrupt Mode<br>00b = No interrupts<br>01b = MSI/MSI-X<br>10b = FW Interrupt (EFN VDM)<br>11b = Reserved<br>Bits[3:2]: Reserved<br>Bits[7:4]: Interrupt Message Number. |
| 9-2 | DPA |

In an example, for the maintenance command of 435, the host system 105-*c* may use a Start Maintenance Command as given in Table 8 as a maintenance command:

TABLE 8

Start Maintenance Commands (4700h)

| Bytes | Description | Value |
|---|---|---|
| 0 | Action | 00h (Memory module repair 0 - fast repair operation) |
| 1 | Maintenance Interrupt Settings | 00h (No interrupts) |
| 9-2 | DPA | XX . . . XXh |

In other examples, the host system 105-*c* may use transmit a start maintenance command (e.g., as shown in Table 8) with an input payload as illustrated in Table 9:

TABLE 9

Start Maintenance Input Load

| Byte Offset | Length | Description |
|---|---|---|
| 00h | 1 | Maintenance Operation Type: Identifies the type of a maintenance operation |
| 01h | 1 | Maintenance Operation Method: Identifies the maintenance operation together with the maintenance operation type |
| 02h | Varies | Maintenance Operation Parameters: Indicates information for the operation (e.g., Target DPA, Query resource flag bit for hard and soft PPR) |

In some examples, the memory system 110-*c* may be configured to provide a return code in response to a maintenance command of 435 (e.g., using the Output Payload of Table 10). In some examples, such a return code may be stored at a register of the memory system 110-*c*, such that the host system 105-*c* may transmit a command at 435 and read the register for the return code or other output payload. In various examples, such a return code may indicate a success, an invalid parameter, an unsupported operation, an internal error, that a retry is required, that the memory system 110-*c* is busy (e.g., that another maintenance command is being processed), that the maintenance operation was aborted, that resources for repair have been exhausted, various command effects, or that the maintenance operation has been performed.

TABLE 10

Output Payload

| Byte Offset | Length | Description |
| --- | --- | --- |
| 00h | 1 | Maintenance Operation Response:<br>00h: No additional information<br>01h-FBh: Reserved<br>FCh: Invalid Maintenance operation type<br>FDh: Invalid Maintenance operation method<br>FEh: Invalid Maintenance operation parameters<br>FFh: General Failure<br>Other Values Reserved |
| 01h | 1 | Maintenance Operation Type Response: Identifies the maintenance operation together with the maintenance operation type<br>00h: No additional information<br>01h-FEh: Maintenance operation type specific codes<br>FFh: General Failure<br>Other Values Reserved |

In some examples, the host system 105-*c* may be configured to copy data from the memory system 110-*c* (e.g., as transferred from the memory system 110-*c* at 405, associated with a logical or physical address indicated in a maintenance indication of 420) to a different location. For example, a performed maintenance operation may be destructive to logic states stored at the memory die 160-*c*, or the host system 105-*c* may proactively save or retrieve data inferred to be stored in a degrading portion of the memory die 160-*c*. In some examples, such data that is transferred may include data as transferred at 405, as well as other data that may be affected by a maintenance operation. In some examples, the host system 105-*c* may evaluate or determine whether such data is valid before performing such a transfer.

In some examples, at 440, the memory system 110-*c* may perform a maintenance operation. For example, at 441, the memory system 110-*c* (e.g., the memory system controller 155-*c*) may initiate a post-package repair on the memory die 160-*c*, which may include transmitting a repair initiation signal or command to the memory die 160-*c*. In various examples, performing the maintenance operation of 430 may be based on determining the error condition (e.g., at 410), or an operation performed by the host system 105-*c*, such as a transmission of a maintenance command by the host system 105-*c* (e.g., at 435). At 442, the memory die 160-*c* may perform a post-package repair (e.g., responsive to the signaling of 441). In some examples, at 443, the memory die 160-*c* may provide an indication of a status (e.g., a completion) of the post package repair, which may include an explicit indication (e.g., a bit, a flag), or an implicit indication (e.g., an indication that the memory die 160-*c* is available for access). In other examples, the memory system 110-*c* may perform a different maintenance operation—e.g., a telemetry operation as described with reference to FIG. 7 or address management operation as described with reference to FIG. 8.

In various examples, the maintenance performed at 440 may be performed in a foreground or background. For example, in a background operation, the memory system 110-*c* may support ongoing access operations (e.g., at 445), such as supporting read or write commands issued by the host system 105-*c*. In a foreground maintenance operation, the memory system 110-*c* may not support ongoing operations, and therefore may refrain from performing access operations during the maintenance operations of 440. In some examples, the memory system 110-*c* may provide an indication of a capability for performing access operations during the maintenance operations (e.g., in the capability indication at 430). In some examples, if the execution of the maintenance operation of 440 exceeds two seconds, or some other threshold duration, the maintenance operation may be moved to a background process.

In some examples, the host system 105-*c* and the memory system 110-*c* may be configured to support various aspects of status signaling relative to the maintenance of 440. For example, at 455, the memory system 110-*c* may transmit an indication of the status of the maintenance operation of 440. If the status indication of 455 is transmitted after the completion of the maintenance operation of 440 (e.g., as shown), the status indication of 455 may indicate that the maintenance operation is complete. If the status indication of 455 is transmitted before completion of the maintenance operation of 440, the status indication of 455 may indicate that the maintenance operation of 440 is ongoing, which may include an indication of a completion percentage or remaining percentage or duration, or the status indication of 455 may indicate that the maintenance operation of 440 has failed or has been aborted. In some examples, a status indication may be signaled proactively, such as according to a duration after receiving a maintenance command or according to a percentage completion (e.g., where the memory system 110-*c* may indicate operation progress in cases of relatively long operations). In other examples, a status indication of 455 may be responsive to a request, such as a status request transmitted by the host system 105-*c* at 450 to check the status of the maintenance operation. In some examples, such a request may refer to a polling of a status register of the memory system 110-*c*. In some examples, the status indication of 455 may be provided in accordance with a Get Maintenance Command Status command (e.g., of a Maintenance Command set illustrated in Table 5.)

Additionally, in some examples, the host system 105-*c* may transmit an initial command (e.g., during initialization) to obtain the supported features of the memory system 110-*c* (e.g., to determine the types of maintenance operations the memory system 110-*c* is configured to perform.) For example, Table 11 may illustrate the commands the host system 105-*c* may transmit, including the start maintenance and the get features command:

TABLE 11

Host Commands

| Command Set Bits [15:8] | | Command Bits [7:0] | | Combined Opcode | Required | Input Payload | Output Payload |
|---|---|---|---|---|---|---|---|
| 01h | Events | 00h | Get Events Record | 0100h | M | 1 | 20h+ |
| | | 01h | Clear Events Record | 010h | M | 8+ | 0 |
| | | 02h | Get Event Interrupt Policy | 0102h | M | 0 | 4 |
| | | 03h | Set Event Interrupt Policy | 0103h | M | 4 | 0 |
| | | 04h | Start Maintenance | 0104h | O | 2+ | 2 |
| 02h | Firmware Updates | 00h | Get FW Info | 0200h | O | 0 | 50h |
| | | 01h | Transfer FW | 0201h | O | 80h+ | 0 |
| | | 02h | Activate FW | 0202h | O | 2 | 0 |
| 03h | Timestamp | 00h | Get Timestamp | 0300h | O | 0 | 8 |
| | | 01h | Set Timestamp | 0301h | O | 8 | 0 |
| 04h | Logs | 00h | Get Supported Logs | 0400h | M | 0 | 8+ |
| | | 01h | Get Log | 0401h | M | 18h | 0+ |
| 05h | CXL Features | 00h | Get Supported Features | 0500h | M | 2 | 8+ |
| | | 01h | Get Feature | 0501h | M | 24 | 0+ |
| | | 02h | Set Feature | 0502h | M | 32+ | |

Table 11 illustrates the addition of the "Start Maintenance command" which may indicate the start of a PPR operation, a telemetry operation, or an address management operation based on the Input Payload illustrated in Table 9. Additionally, Table 11 illustrates the host system 105-*c* may transmit a command to get supported features, get feature, or set feature. That is, in some examples, the host system 105-*c* may request a quantity and list of features supported by the memory system 110-*c* (e.g., get supported features command). In other examples, the host system 105-*c* may request a specific feature's data (e.g., get feature command).

In some examples, the memory system 110-*c* may transmit the feature data in response to the "get feature" or "get supported features" command from the host system 105-*c*. In some examples, the feature output payload may be illustrated by Table 12 (e.g., an example of one feature supported by the device and transmitted to the host system 105-*c*):

TABLE 12

Features Output Payload

| Byte Offset | Length | Attribute | Description |
|---|---|---|---|
| 00h | 1 | RO | Version: Field indicates the version of this feature |
| 01h | 1 | RO | Length: Indicates the length of the feature in bytes |
| 02h | 1 | RO | Maintenance Operation Timeout: This field indicates the operation timeout<br>Bit [7:4] These bits Specify Operation Timeout Value<br>Bits [3:0] These bits specify the time scale<br>0000b: 1 microsecond<br>0001b: 10 microseconds<br>0010b: 100 microseconds<br>0011b: 1 millisecond<br>0100b: 10 milliseconds<br>0101b: 100 milliseconds<br>0110b: 1 second<br>0111b: 10 seconds<br>Other values reserved |
| 03h | 2 | RW | Operation Flags<br>Bit[0] Device Initiated: A value of one indicates the memory system 110-c may initiate the maintenance operation at any time without host system 105-c control. If set to 0, the memory system 110-c shall initiate operation only when receiving the command from the host system 105-c. Reset with power cycle or system reset<br>Bit [15:1]:Reserved |
| 05h | 1 | RO | Maintenance Operation Type: Field specifies the maintenance type. Value is set in Event Records to request this operation and in the start maintenance input payload to initiate the operation |
| 06h | 1 | RO | Maintenance Operation Method: Field specifies the maintenance operation method. This value is set in the start maintenance input payload to initiate the maintenance operation |
| 07h | 9 | RsvdZ | Reserved |
| 10h | Varies | — | Operation Specific Fields |

By receiving the features output payload, the host system 105-*c* may determine the maintenance operations the memory system 110-*c* may perform. The host system 105-*c* may also use the features output payload to set values for the Start Maintenance Input Load as illustrated in Table 9. Table 13 and 14 illustrate examples of the host system 105-c receiving feature output payloads that indicate the memory system 110-c supports soft and hard PPR maintenance operations.

TABLE 13

Hard PPR Features Output Payload

| Byte Offset | Length | Attribute | Description |
|---|---|---|---|
| 00h | 1 | RO | Version: Field indicates the version of this feature |
| 01h | 1 | RO | Length: Indicates the length of the feature in bytes |
| 02h | 1 | RO | Maintenance Operation Timeout: This field indicates the operation timeout |
| 03h | 2 | RW | Operation Flags<br>Bit[0] Device Initiated |
| 05h | 1 | RO | Maintenance Operation Type: Field set to 01h (DRAM PPR as indicated in Table 6) |
| 06h | 1 | RO | Maintenance Operation Method: Field set to 00h (Indicates Hard PPR) |
| 07h | 9 | RsvdZ | Reserved |
| 10h | 1 | RO | Hard PPR Flags<br>Bit [0] Target DPA. If set, the memory system 110-c supports Target DPA in the Start Maintenance command input payload<br>Bit [7:1] Reserved |
| 11h | 2 | RO | Restriction Flags<br>Bit [0]: If set to 1, during the execution of this maintenance operation, a portion of the medium may not be accessible (e.g., certain memory die 160-c may be inaccessible) and requests to those portions may be dropped. If set to 0, requests will be processed<br>Bit [1]: If set to 1, during execution of this maintenance operation, data stored in a portion of the medium may be lost<br>Bit [15:2] Reserved |

TABLE 14

Soft PPR Features Output Payload

| Byte Offset | Length | Attribute | Description |
|---|---|---|---|
| 00h | 1 | RO | Version: Field indicates the version of this feature |
| 01h | 1 | RO | Length: Indicates the length of the feature in bytes |
| 02h | 1 | RO | Maintenance Operation Timeout: This field indicates the operation timeout |
| 03h | 2 | RW | Operation Flags<br>Bit[0] Device Initiated |
| 05h | 1 | RO | Maintenance Operation Type: Field set to 01h (DRAM PPR as indicated in Table 6) |
| 06h | 1 | RO | Maintenance Operation Method: Field set to 01h (Indicates Soft PPR) |
| 07h | 9 | RsvdZ | Reserved |
| 10h | 1 | RO | Soft PPR Flags<br>Bit [0] Target DPA. If set, the memory system 110-c supports Target DPA in the Start Maintenance command input payload<br>Bit [7:1] Reserved |
| 11h | 2 | RO | Restriction Flags<br>Bit [0]: If set to 1, during the execution of this maintenance operation, a portion of the medium may not be accessible (e.g., certain memory die 160-c may be inaccessible) and requests to those portions may be dropped. If set to 0, requests will be processed<br>Bit [1]: If set to 1, during execution of this maintenance operation, data stored in a portion of the medium may be lost<br>Bit [15:2] Reserved |

It should be noted, theses tables are examples only and are not limiting on the claims. Other tables and ways to communicate information between the host system 105-c and the memory system 110-c may be possible. In other examples, the memory system 110-c may also transmit tables similar to Tables 13 and 14 but for the telemetry and address management operations and features.

Figure 5:
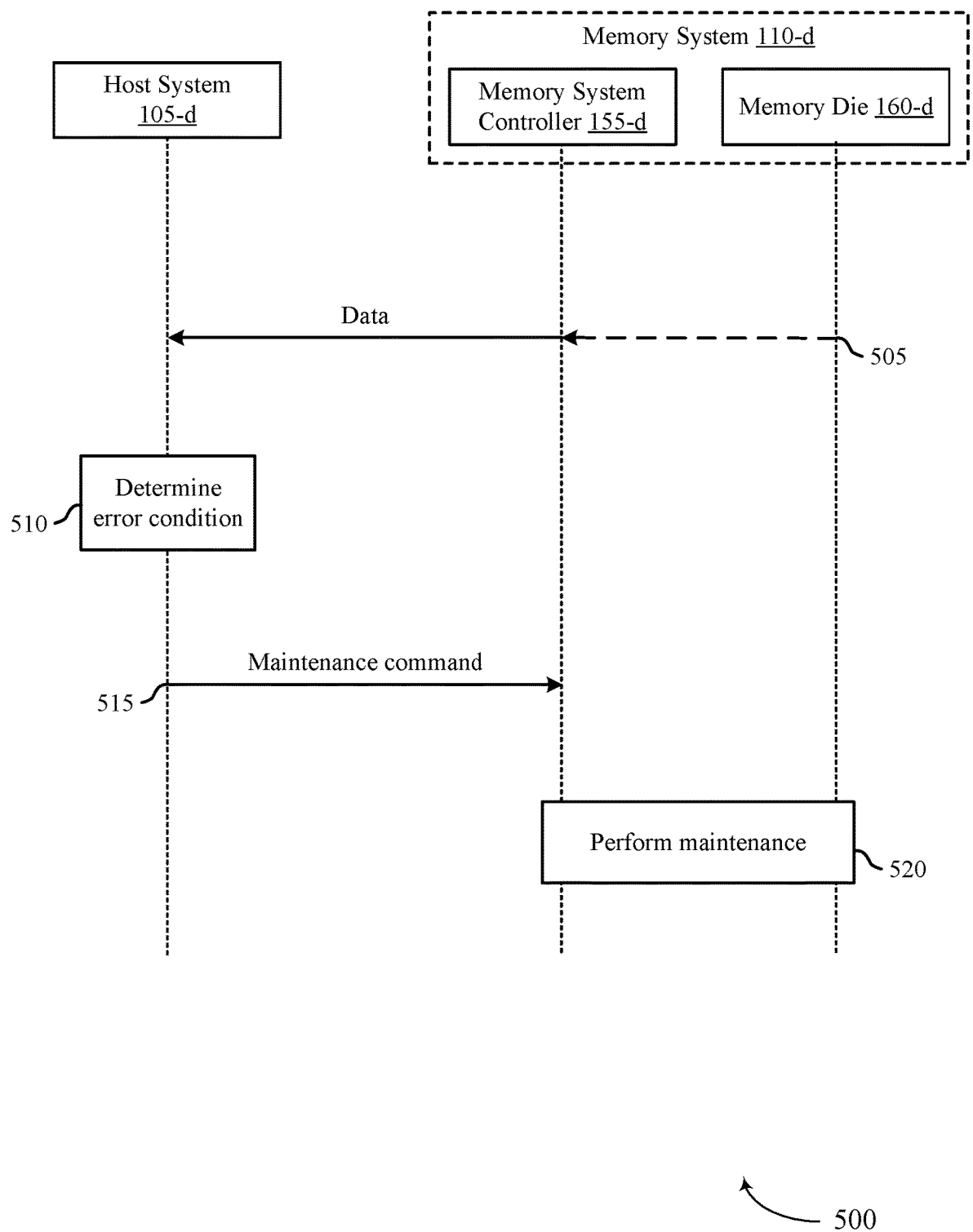

FIG. 5 illustrates an example of a process flow 500 that supports log management maintenance operation and command in accordance with examples as disclosed herein. The process flow 500 is described with reference to a host system 105-d and a memory system 110-d, which may be physically or operatively coupled via an interface (e.g., via channels 115, according to a memory interface or memory protocol). The memory system 110-d may include a memory system controller 155-d and a memory die 160-d. Although the memory system 110-d is illustrated with one memory die 160, a memory system 110 in accordance with aspects of the process flow 500 may include any quantity of memory dies 160. Further, although the host system 105-*d* is illustrated as being coupled with one memory system 110, a host system 105 in accordance with aspects of the process flow 500 may be coupled with any quantity of memory systems 110. The process flow 500 may illustrate aspects of a host-initiated maintenance in accordance with examples as disclosed herein.

At 505, the host system 105-*d* may receive data from the memory system 110-*d* (e.g., from the memory system controller 155-*d*). The data of 505 may be associated with a logical address of the memory system 110-*d* (e.g., an HPA, a DPA). In some examples, the data may be retrieved from the memory die 160-*d* by accessing one or more memory cells 205 of the memory die 160-*d*, which may be responsive to a command from the host system 105-*d* (e.g., a read command received by the memory system controller 155-*d* and processed to access the memory die 160-*d*), or may be responsive to other accessing within the memory system 110-*d* (e.g., related to memory management techniques of the memory system 110-*d*, not responsive to a command from the host system 105-*d*).

At 510, the host system 105-*d* may determine an error condition associated with a physical address of the memory system 110-*d* (e.g., of the memory die 160-*d*, based on the data of 505). For example, the host system 105-*d* may determine that a quantity of errors in the data of 505 satisfies a threshold, or that a rate of errors in the data of 505 satisfies a threshold.

At 515, the host system 105-*d* may transmit a maintenance command to the memory system 110-*d* (e.g., a command to perform a maintenance operation associated with the logical address of the memory system 110-*d*). Transmitting the maintenance command at 515 may be based at least in part on determining the error condition at 510.

At 520, the memory system 110-*d* may perform a maintenance operation (e.g., based on receiving the command of 515). For example, the memory system 110-*d* (e.g., the memory system controller 155-*d*) may initiate a post-package repair on the memory die 160-*d*.

Although described in the context of a maintenance performed on a physical address of the memory die 160-*d* (e.g., associated with an error of the physical address), the described techniques may be extended to additional circumstances. For example, the host system 105-*d* may identify a need for maintenance that is not strictly related to or limited to a physical address of the memory die 160-*d* detected to have an error. Such maintenance may be more generally related to storage medium of the memory die 160-*d*, and may be triggered by other various conditions.

Figure 6:
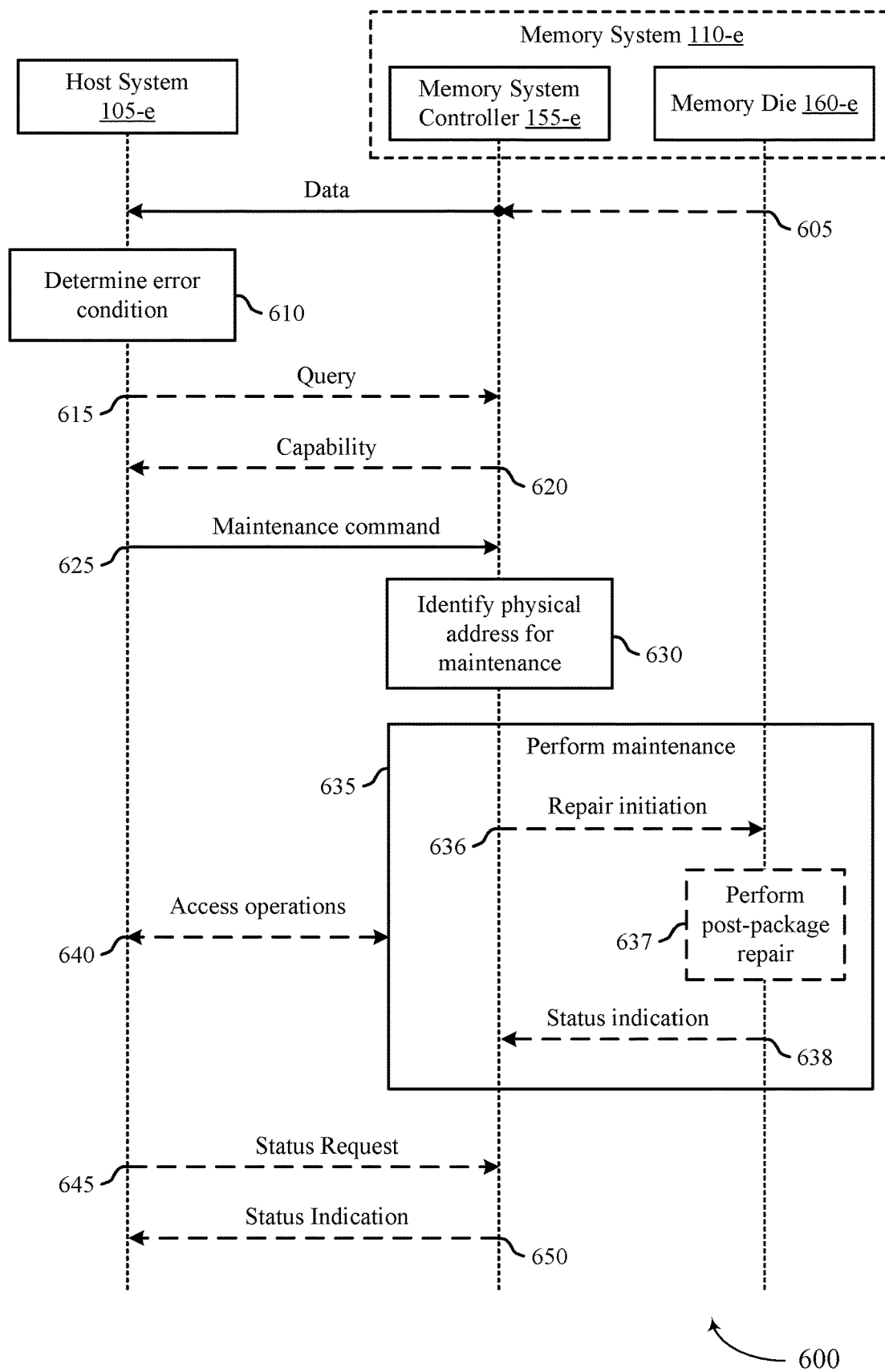

FIG. 6 illustrates an example of a process flow 600 that supports log management maintenance operation and command in accordance with examples as disclosed herein. The process flow 600 is described with reference to a host system 105-*e* and a memory system 110-*e*, which may be physically or operatively coupled via an interface (e.g., via channels 115, according to a memory interface or memory protocol). The memory system 110-*e* may include a memory system controller 155-*e* and a memory die 160-*e*. Although the memory system 110-*e* is illustrated with one memory die 160, a memory system 110 in accordance with aspects of the process flow 600 may include any quantity of memory dies 160. Further, although the host system 105-*e* is illustrated as being coupled with one memory system 110, a host system 105 in accordance with aspects of the process flow 600 may be coupled with any quantity of memory systems 110.

The process flow 600 may illustrate aspects of a host-initiated maintenance in accordance with examples as disclosed herein. The process flow 600 and related descriptions may include various enhancements to a Module Event Record (e.g., a Memory Module Event Record of an Event Record of the memory system 110-*e*), which may include adding various information related to maintenance. The process flow 600 and related descriptions may also illustrate implementations of a dedicated command set in a Memory Device Command interface to manage maintenance operations, including examples of capability indications, status indications, and registers for such management.

At 605, the host system 105-*e* may receive data from the memory system 110-*e* (e.g., from the memory system controller 155-*e*). The data of 605 may be associated with a logical address of the memory system 110-*e* (e.g., an HPA, a DPA). In some examples, the data may be retrieved from the memory die 160-*e* by accessing one or more memory cells 205 of the memory die 160-*e*, which may be responsive to a command from the host system 105-*e* (e.g., a read command received by the memory system controller 155-*e* and processed to access the memory die 160-*e*), or may be responsive to other accessing within the memory system 110-*e* (e.g., related to memory management techniques of the memory system 110-*e*, not responsive to a command from the host system 105-*e*).

At 610, the host system 105-*e* may determine an error condition associated with a physical address of the memory system 110-*e* (e.g., of the memory die 160-*e*, based on the data of 605). For example, the host system 105-*e* may determine that a quantity of errors in the data of 605 satisfies a threshold, or that a rate of errors in the data of 605 satisfies a threshold, or that some threshold amount of errors or data poison are otherwise present in the data of 605.

In some examples, the host system 105-*e* may be configured to copy data from the memory system 110-*e* (e.g., as transferred from the memory system 110-*e* at 605, associated with a logical or physical address of the data of 605) to a different location. For example, a performed maintenance operation may be destructive to logic states stored at the memory die 160-*e*, or the host system 105-*e* may proactively save or retrieve data inferred to be stored in a degrading portion of the memory die 160-*e*. In some examples, such data that is transferred may include data as transferred at 605, as well as other data that may be affected by a maintenance operation. In some examples, the host system 105-*e* may evaluate or determine whether such data is valid before performing such a transfer or copying.

In some examples, the host system 105-*e* and the memory system 110-*e* may be configured to support various aspects of capability signaling relative to a maintenance operation (e.g., of 640). For example, at 615 (e.g., based on determining the error condition at 610), the host system 105-*e* may transmit a query (e.g., using a Check Maintenance Resources field of a Maintenance Command Set as illustrated in Table 5) to the memory system 110-*e* to request an indication of a capability of the memory system 110-*e* for performing maintenance operations. The memory system 110-*e* may respond, at 620, with a capability indication. Such a capability indication may indicate a quantity of available repairs at the memory system 110-*e*, such as a quantity of swappable rows for a remapping operation, or some other quantity of redundant or otherwise available components. In some examples, such a capability indication may include a quantity of available maintenance operations organized or conveyed by maintenance operation type, or other maintenance parameters such as latencies or timeouts associated with each type of maintenance command supported by the memory system 110-*e*. In some examples, the query of 615 may include a query by the host system 105-*e* of whether a target address (e.g., a target DPA, a target HPA) is repairable. Although described in the context of a handshake or responsive signaling, in some examples, a capability indication of 620 may be signaled proactively (e.g., without a transmission or receipt of a query of 615). In some examples, capability signaling may be omitted, not configured, or otherwise not performed, in which case the operations of 615 and 620 may be omitted.

At 625, the host system 105-*e* may issue a maintenance command to the memory system 110-*e* (e.g., to the memory system controller 155-*e*). The maintenance command of 625 may be an explicit command for the memory system 110-*e* to perform a maintenance operation of 640 (e.g., using a Start Maintenance field of the Maintenance Command Set as illustrated in Table 5). In some examples, the maintenance command of 625 may be a command to start a maintenance operation on an address (e.g., DPA, HPA) associated with the data 605 and identified by the host system 105-*e* as having an error condition (e.g., at 610). In some examples, a maintenance command of 625 may be issued at a later time, based on a delay determined by the host system 105-*e*, or may specify a time for the memory system 110-*e* to perform a maintenance operation.

In some examples, the memory system 110-*e* may be configured to provide a return code in response to a maintenance command of 625 (e.g., using the Output Payload of Table 10). In some examples, such a return code may be stored at a register of the memory system 110-*e*, such that the host system 105-*e* may transmit a command at 625 and read the register for the return code or other output payload. In various examples, such a return code may indicate a success, an invalid parameter, an unsupported operation, an internal error, that a retry is required, that the memory system 110-*e* is busy (e.g., that another maintenance command is being processed, that the maintenance operation was aborted, various command effects, or that the maintenance operation has been performed.

At 630, the memory system 110-*e* (e.g., the memory system controller 155-*e*) may identify a physical address for performing the commanded maintenance. For example, the maintenance command of 625 may be associated with (e.g., include) an indication of an HPA, which may be translated into a DPA by an HDM decoder of the memory system 110-*c*. The determined DPA may be further translated using an L2P mapping of the memory system 110-*c* to determine a physical address of the memory die 160-*e* for performing the maintenance operation. Alternatively, in some examples, the maintenance command of 625 may be associated with (e.g., include) an indication of a DPA, which may be translated into a physical address of the memory die 160-*e*.

At 635, the memory system 110-*e* may perform a maintenance operation (e.g., on the physical address identified at 630). For example, at 636, the memory system 110-*e* (e.g., the memory system controller 155-*e*) may initiate a post-package repair on the memory die 160-*e*, which may include transmitting a repair initiation signal or command to the memory die 160-*e*. At 637, the memory die 160-*e* may perform a post-package repair (e.g., responsive to the signaling of 636). In some examples, at 638, the memory die 160-*e* may provide an indication of a status (e.g., a completion) of the post package repair, which may include an explicit indication or an implicit indication.

In various examples, the maintenance performed at 635 may be performed in a foreground or background. For example, in a background operation, the memory system 110-*e* may support ongoing access operations (e.g., at 640), such as supporting read or write commands issued by the host system 105-*e*, or supporting access to configure the memory system 110-*e*, access to discovery capabilities of the memory system 110-*e*, or access to check a status of the memory system 110-*e*. In a foreground maintenance operation, the memory system 110-*e* may not support ongoing operations, and therefore may refrain from performing access operations during the maintenance operations of 635. In some examples, the memory system 110-*e* may provide an indication of a capability for performing access operations during the maintenance operations (e.g., in the capability indication at 620). In some examples, if the execution of the maintenance operation of 635 exceeds two seconds, or some other threshold duration, the maintenance operation may be moved to a background process.

In some examples, the host system 105-*e* and the memory system 110-*e* may be configured to support various aspects of status signaling relative to the maintenance of 635. For example, at 650, the memory system 110-*e* may transmit an indication of the status of the maintenance operation of 635. If the status indication of 650 is transmitted after the completion of the maintenance operation of 635 (e.g., as shown), the status indication of 650 may indicate that the maintenance operation is complete. If the status indication of 650 is transmitted before a completion of the maintenance operation of 635, the status indication of 650 may indicate that the maintenance operation of 635 is ongoing, which may include an indication of a completion percentage or remaining percentage or duration, or the status indication of 650 may indicate that the maintenance operation of 635 has failed or has been aborted. In some examples, a status indication may be signaled proactively, such as according to a duration after receiving a maintenance command or according to a percentage completion (e.g., where the memory system 110-*e* may indicate operation progress in cases of relatively long operations). In other examples, a status indication of 650 may be responsive to a request, such as a status request transmitted by the host system 105-*e* at 645 to check the status of the maintenance operation. In some examples, such a request may refer to a polling of a status register of the memory system 110-*e*. In some examples, the status indication of 650 may be provided in accordance with a Get Maintenance Command Status command (e.g., of a Maintenance Command set illustrated in Table 5.

Figure 7:
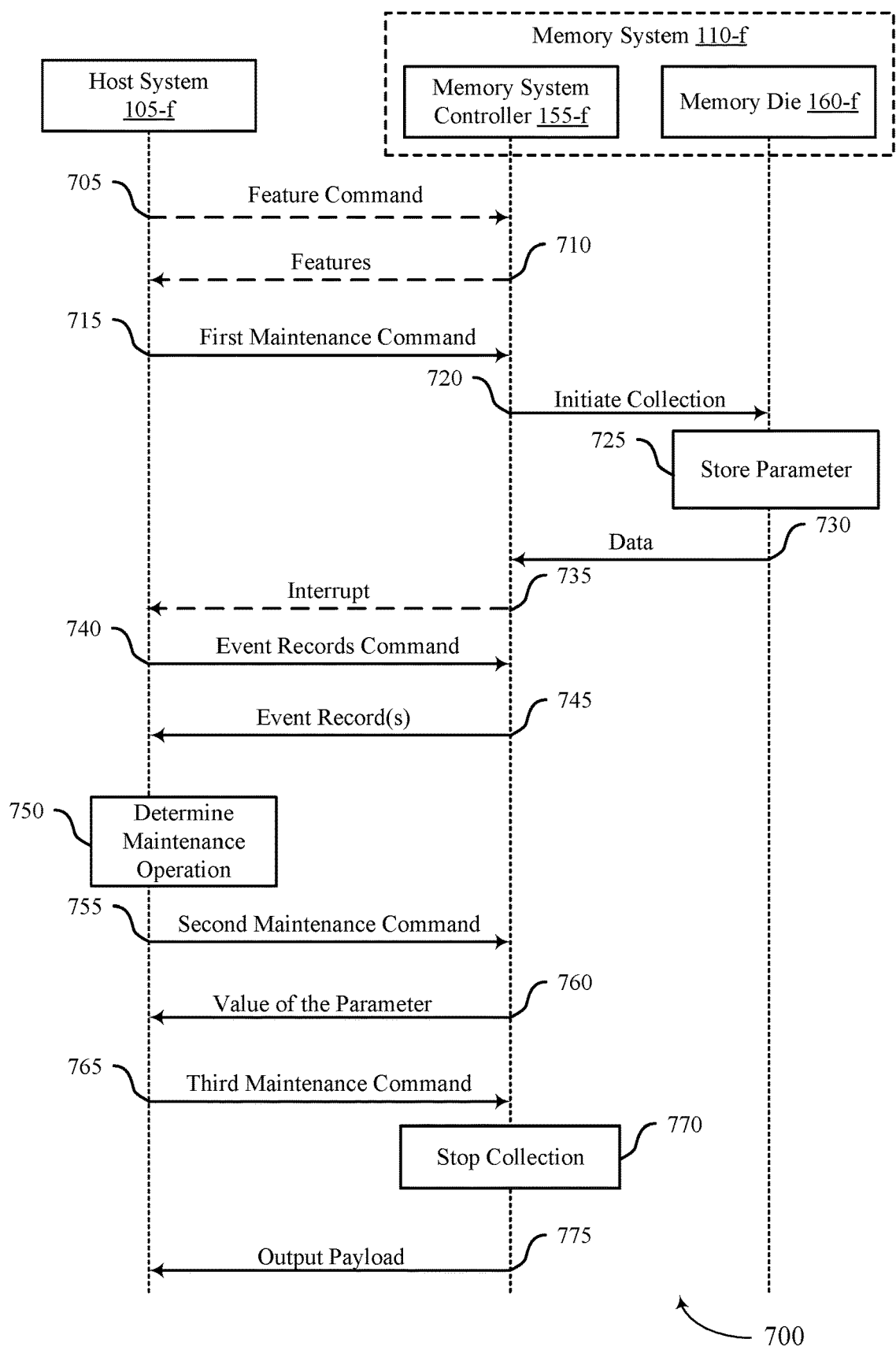

FIG. 7 illustrates an example of a process flow 700 that supports log management maintenance operation and command in accordance with examples as disclosed herein. The process flow 700 and related descriptions may include various enhancements to a start maintenance command issued by a host system 105-*f* to the memory system 110-*f*, which may include adding various information related to maintenance. The process flow 700 and related descriptions may also illustrate implementations of a dedicated command set in a Memory Device Command interface to manage maintenance operations, including examples of capability indications, status indications, and registers for such management, as indicated in Tables 6, 9, 10, 11, 12.

At 705, the host system 105-*f* may transmit a feature command to the memory system 110-*f* (e.g., to the memory system controller 155-*f*). In some examples, the feature command may be an example of "Get Supported Features" or "Get Feature" command illustrated in Table 11. For example, the host system 105-*f* may transmit the feature command during an initialization phase to determine maintenance operations supported by the memory system 110-*f*. In other examples, the host system 105-*f* may transmit the feature command to determine whether the memory system 110-f supports a specific maintenance command—e.g., supports collecting telemetry data. The host system 105-f may also transmit the feature command to determine which value to set as the maintenance type and maintenance method as described with reference to Table 6.

At 710, the memory system 110-f may transmit a feature payload output to the host system 105-f. For example, the memory system 110-f may transmit data as represented by Table 12 that indicates the time scale of a given maintenance operation, operation flags, maintenance operation type and maintenance operation method, along with any additional operation specific data. For example, the memory system 110-f may indicate the maintenance operation type having a value "02h" and a maintenance operation method having a value "00h" associated with a Start Telemetry operation, a value "01h" associated with a Read Telemetry Data operation, and a value "02h" associated with a Stop Telemetry Data operation as indicated in Table 6.

At 715, the host system 105-f may transmit a first maintenance command to the memory system 110-f (e.g., to the memory system controller 155-f). The first maintenance command may include a Start Maintenance Input Load as illustrated in Table 9—e.g., the first maintenance command indicates a start telemetry operation. For example, the host system 105-f may indicate to the memory system 110-f to initiate collecting values of a parameter of the memory system. For example, the parameter may be associated with the memory system controller 155-h, a performance metric of the memory system 110-f, a reliability metric of the memory system 110-f, any other metric, or any combination thereof.

At 720, the memory system 110-f may initiate collection of the telemetry data. In some examples, the memory system controller 155-f may determine the first maintenance command is associated with the start telemetry operation based on a first portion and second portion of the command. For example, the first portion of the command may indicate the command received from the host system 105-f is associated with a Start Maintenance Operation. In some examples, the second portion of the command may be the Start Maintenance Input Load as illustrated in Table 9. That is, the memory system controller 155-f may read a value "02h" for the maintenance operation type and "00h" for the maintenance operation method to determine the operation is associated with Start Telemetry.

At 725, a value of a parameter may be stored at the memory die 160-f. In some examples, the value may be stored based on an event associated with the parameter. For example, values of the parameter may be stored after a change in the parameter, an operation associated with the parameter, or an expiration of a time period. For example, if the host system 105-f requests telemetry data associated with a performance of the memory system 110-f, a value of the parameter indicating a performance after a recent access operation may be stored—e.g., after the memory system 110-f performs a read operation. The Start Telemetry method may indicate to store values for multiple parameters, and each parameter may be associated with one or more events triggering storing the parameter. Although the parameter is illustrated as being stored at the memory die 160-f, in some cases the parameter may be stored at the memory system controller 155-f (e.g., in a local memory or register). In such cases, the initiation of collection of the telemetry data 720 may involve one or more commands between the memory system controller 155-f and the memory die 160-f.

At 730, memory die 160-f may transmit data to the memory system controller 155-f. For example, the memory die 160-f may transfer data associated with executing an access operation or after a request from the memory system controller 155-f. In some examples, the data may include the value of the parameter stored at 725.

At 735, the memory system controller 155-f may transmit an interrupt to the host system 105-f indicating an availability of the value of the parameter based on receiving the value of the parameter from the memory die 160-f. For example, the memory system controller 155-f may transmit an interruption (e.g., an MSI/MSI-x or FW interrupt). For example, the memory system controller 155-f may transmit an interrupt signal to a processing unit of the host system (MSI interrupt). In other examples, the memory system controller 155-f may set a flag in a firmware interrupt payload to a processing unit of the host system 105-f. In other examples, the memory system controller 155-h may not transmit an interrupt—e.g., the memory system controller 155-h may wait for an event records command based on the host system 105-f polling the memory system 110-f to indicate the availability of the value of the parameter.

At 740, the host system 105-f may transmit an event records command (e.g., get event records) command to the memory system controller 155-f. In some example, the host system 105-f may transmit the event records command as part of a polling operation—e.g., requesting the event records periodically at a determined interval. In other examples, the host system 105-f may transmit the event records command in response to an interrupt by the memory system 110-f.

At 745, the memory system 110-f may transmit event record(s) to the host system 105-f. For example, the memory system 110-f may transmit data illustrated in Table 1A or 1B. The memory system 110-f may indicate or request to the host system 105-f the initiation of a maintenance operation. For example, the memory system 110-f may transmit a request for a Read Telemetry Data maintenance operation to the host system 105-f and also indicate the availability of the value of the parameter.

At 750, the host system 105-f may determine a type of maintenance operation to perform. For example, the host system 105-f may determine to initiate a Read Telemetry operation based on receiving the event record(s) from the memory system 110-f at 745. In other examples, the host system 105-f may wait to perform a maintenance operation or determine not to perform a maintenance operation all together.

At 755, the host system 105-f may transmit a second maintenance command. For example, the host system 105-f may transmit a Read Telemetry command based on receiving the indication of the availability of the value of the parameter. As described at 715, the maintenance command may include a first portion and a second portion, as illustrated in Tables 6 and 9.

At 760, the memory system 110-f transmit the value of the parameter to the host system 105-f. In some examples, the memory system controller 155-f may determine the second maintenance command is associated with the read telemetry operation based on a first portion and second portion of the command. For example, the first portion of the command may indicate the command received from the host system 105-f is associated with a Start Maintenance Operation. In some examples, the second portion of the command may be the Start Maintenance Input Load as illustrated in Table 9. That is, the memory system controller 155-f may read a value "02h" for the maintenance operation type and "01h"

for the maintenance operation method to determine the operation is associated with Read Telemetry. In some examples, when transmitting the value of the parameter, the memory system 110-*f* may also transmit an output payload as illustrated in Table 10. That is, the memory system may indicate if the operation was successful and any additional information to the host system 105-*f*.

At 765, the host system 105-*f* may transmit a third maintenance command. For example, the host system 105-*f* may transmit a Stop Telemetry command based on receiving the value of the parameter or determining enough Telemetry data has been collected. As described at 715, the maintenance command may include a first portion and a second portion, as illustrated in Tables 6 and 9.

At 770, the memory system 110-*f* may stop collection of the of the telemetry data. In some examples, the memory system controller 155-*f* may determine the third maintenance command is associated with the stop telemetry operation based on a first portion and second portion of the command. For example, the first portion of the command may indicate the command received from the host system 105-*f* is associated with a Start Maintenance Operation. In some examples, the second portion of the command may be the Start Maintenance Input Load as illustrated in Table 9. That is, the memory system controller 155-*f* may read a value "02h" for the maintenance operation type and "02h" for the maintenance operation method to determine the operation is associated with Stop Telemetry.

At 775, the memory system 110-*f* may transmit an output payload to the host system 105-*f* and indicate that telemetry data has stopped being collected. For example, the memory system 110-*f* may transmit the data in an output payload as illustrated in Table 10.

Figure 8:
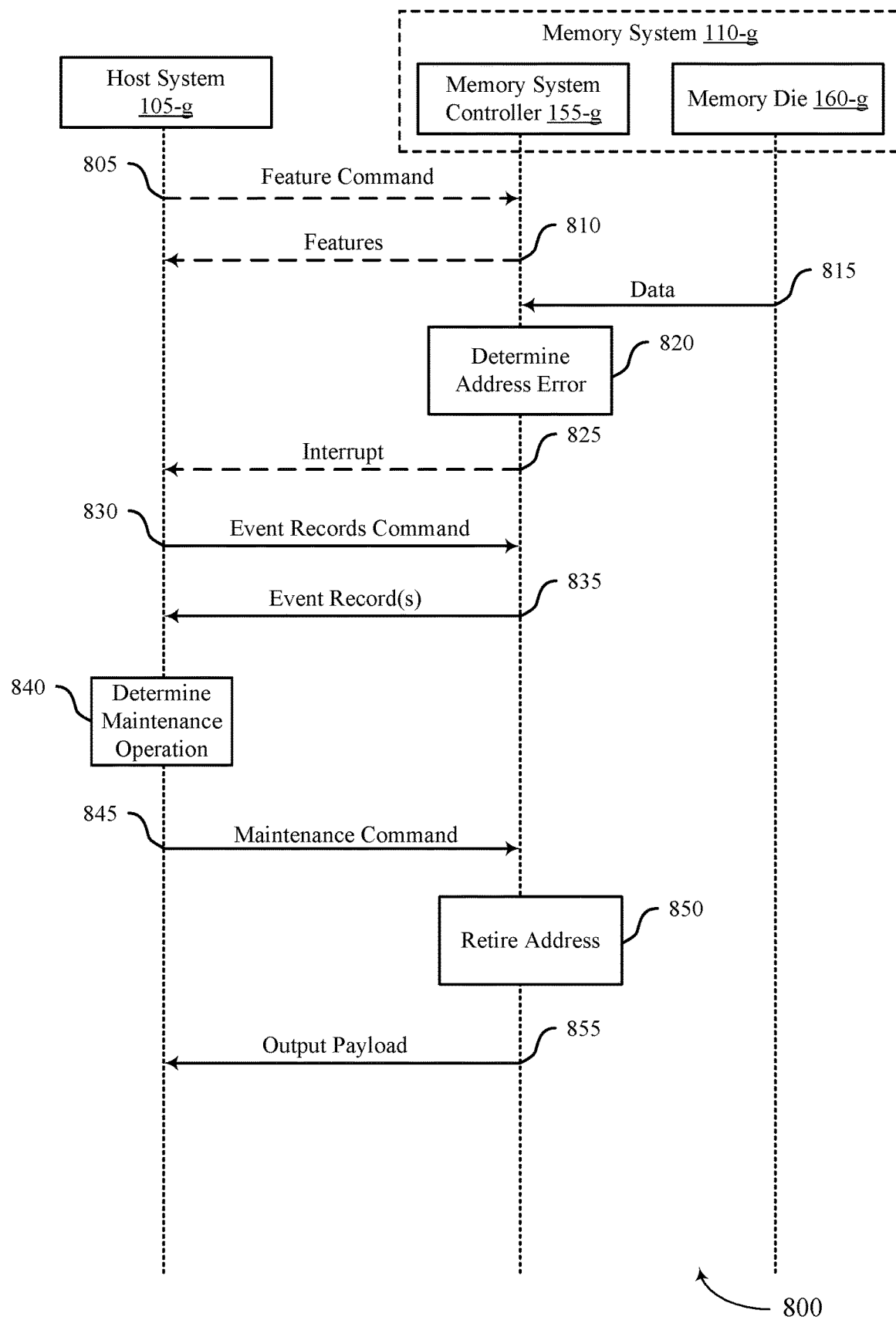

FIG. 8 illustrates an example of a process flow 800 that supports log management maintenance operation and command in accordance with examples as disclosed herein. The process flow 800 and related descriptions may include various enhancements to a start maintenance command issued by a host system 105-*g* to the memory system 110-*g*, which may include adding various information related to maintenance. The process flow 800 and related descriptions may also illustrate implementations of a dedicated command set in a Memory Device Command interface to manage maintenance operations, including examples of capability indications, status indications, and registers for such management, as indicated in Tables 6, 9, 10, 11, 12.

At 805, the host system 105-*g* may transmit a feature command to the memory system 110-*g* (e.g., to the memory system controller 155-*g*). In some examples, the feature command may be an example of "Get Supported Features" or "Get Feature" command illustrated in Table 11. For example, the host system 105-*g* may transmit the feature command during an initialization phase to determine maintenance operations supported by the memory system 110-*g*. In other examples, the host system 105-*g* may transmit the feature command to determine whether the memory system 110-*g* supports a specific maintenance command—e.g., supports address management. The host system 105-*g* may also transmit the feature command to determine which value to set as the maintenance type and maintenance method as described with reference to Table 6.

At 810, the memory system 110-*g* may transmit a feature payload output to the host system 105-*g*. For example, the memory system 110-*g* data represented by Table 12 that indicates the time scale of a given maintenance operation, operation flags, maintenance operation type and maintenance operation method, along with any additional operation specific data. For example, the memory system 110-*g* may indicate the maintenance operation type having a value "03h" and a maintenance operation method having a value "00h" associated with an address management operation (e.g., retire address) as indicated in Table 6.

At 815, memory die 160-*g* may transmit data to the memory system controller 155-*g*. For example, the data at 815 may be associated with a logical address of the memory system 110-*g* (e.g., an HPA, a DPA). In some examples, the data may be retrieved from the memory die 160-*g* by accessing one or more memory cells 205 of the memory die 160-*g*, which may be responsive to a command from the host system 105-*g* (e.g., a read command received by the memory system controller 155-*g* and processed to access the memory die 160-*d*), or may be responsive to other accessing within the memory system 110-*g* (e.g., related to memory management techniques of the memory system 110-*g*, not responsive to a command from the host system 105-*g*).

At 820, the memory system controller 155-*g* may determine a quantity of errors. In some examples, the data may also include an indication of a quantity of errors associated with a memory address of the memory die 160-*g*. For example, the host system 105-*g* may determine an error condition associated with a physical address of the memory system 110-*g*. In some examples, the quantity of errors may be associated with uncorrectable errors or correctable errors. In some instances, the quantity of errors may also satisfy an error threshold. For example, a single uncorrectable error may satisfy the error threshold. In other examples, for correctable errors, the memory system controller 155-*g* may determine the quantity of errors exceeds an error threshold set by the host system 105-*g*. In other examples, the memory system controller 155-*g* may determine the quantity of correctable errors is too close to internal ECC capabilities (e.g., the memory system controller 155-*g* is performing excessive amounts of error correction operations). Alternatively, the memory system 110-*g* may also determine the quantity of errors does not satisfy the threshold and may refrain from notifying the host system 105-*g* to retire the memory address.

At 825, the memory system controller 155-*g* may transmit an interrupt to the host system 105-*g* indicating the quantity of errors satisfies the threshold based on determining the quantity of errors received from the memory die 160-*g*. For example, the memory system controller 155-*g* may transmit an interruption (e.g., an MSI/MSI-x or FW interrupt). For example, the memory system controller 155-*g* may transmit an interrupt signal to a processing unit of the host system (MSI interrupt). In other examples, the memory system controller 155-*g* may set a flag in a firmware interrupt payload to a processing unit of the host system 105-*g*. In other examples, the memory system controller 155-*g* may not transmit an interrupt—e.g., the memory system controller 155-*g* may wait for an event records command based on the host system 105-*g* polling the memory system 110-*g* to indicate the quantity of errors satisfies the threshold.

At 830, the host system 105-*g* may transmit an event records command (e.g., get event records) command to the memory system controller 155-*g*. In some example, the host system 105-*g* may transmit the event records command as part of a polling operation—e.g., transmitting the event records periodically at a determined interval. In other examples, the host system 105-*g* may transmit the event records command in response to an interrupt by the memory system 110-*g*.

At 835, the memory system 110-*g* may transmit event record(s) to the host system 105-*g*. For example, the memory system 110-*f* may transmit data illustrated in Table 1A or 1B. The memory system 110-*g* may indicate or request to the host system 105-*g* an initiation of a maintenance operation. For example, the memory system 110-*g* may transmit a request for an address management maintenance operation to retire a memory address to the host system 105-*g* based on determining the memory address is associated with a quantity of errors that satisfies the threshold. In some examples, the event record(s) may also indicate the memory address associated with the quantity of errors in the memory system 110-*g* address space.

At 840, the host system 105-*g* may determine a type of maintenance operation to perform. For example, the host system 105-*g* may determine to initiate an address management operation to retire an address based on receiving the event record(s) from the memory system 110-*g* at 830. In other examples, the host system 105-*g* may wait to perform a maintenance operation or determine not to perform a maintenance operation all together.

At 845, the host system 105-*g* may transmit a maintenance command to the memory system 110-*g* (e.g., to the memory system controller 155-*g*). The first maintenance command may include a Start Maintenance Input Load as illustrated in Table 9—e.g., the first maintenance command may indicate a retire memory address operation. For example, the host system 105-*g* may indicate to the memory system 110-*g* to initiate a maintenance operation associated with maintenance for the memory system 110-*g* and indicating a retirement of the memory address for the address space associated with the memory system 110-*g* based on receiving the event record(s). In some examples, the host system 105-*g* may indicate whether the errors are correctable.

At 850, the memory system 110-*g* may retire the memory address indicated in the command received from the host system 105-*g*. For example, the memory system 110-*g* may refrain from monitoring error rates for the address—e.g., the memory system 110-*g* may stop tracking the quantity of errors associated with the memory address. In other examples, the memory system 110-*g* may refrain from sending any notifications (e.g., event records, interrupts) to the host system 105-*g* based on the memory address being retired—e.g., refrain from notifying the host system 105-*g* about a quantity of errors associated with the retired memory system 110-*g* address. In such examples, the memory system 110-*g* may save resources by refraining from attempting to replace or correct the errors. That is, the memory system 110-*g* may increase the performance of the system by retiring the memory address.

At 855, the memory system 110-*g* may transmit an output payload to the host system 105-*g* and indicate that the memory address has been retired. For example, the memory system 110-*g* may transmit the data in an output payload as illustrated in Table 10 indicating the type of operation and method of maintenance operation performed. The memory system 110-*g* may also notify the host system 105-*g* of any failures in the maintenance operation in the output payload.

Figure 9:
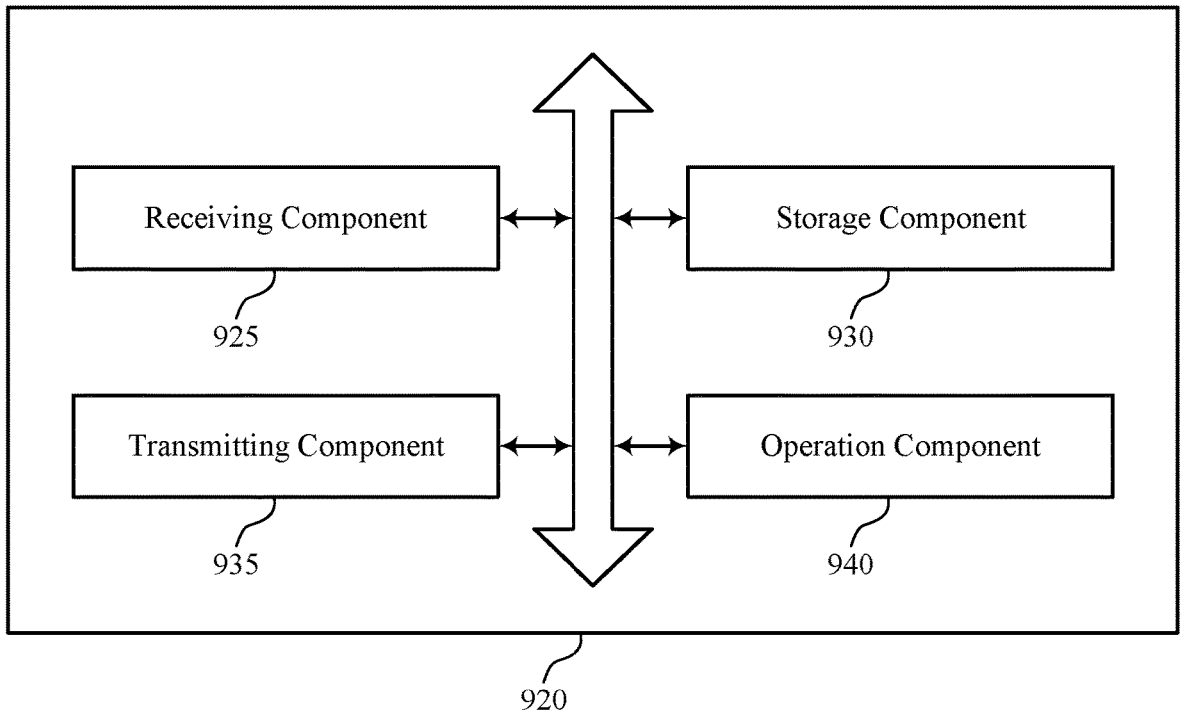
FIG. 9 shows a block diagram of a memory system that supports log management maintenance operation and command in accordance with examples as disclosed herein.

FIG. 9 shows a block diagram 900 of a memory system 920 that supports log management maintenance operation and command in accordance with examples as disclosed herein. The memory system 920 may be an example of aspects of a memory system as described with reference to FIGS. 1 through 8. The memory system 920, or various components thereof, may be an example of means for performing various aspects of log management maintenance operation and command as described herein. For example, the memory system 920 may include a receiving component 925, a storage component 930, a transmitting component 935, an operation component 940, or any combination thereof. Each of these components may communicate, directly or indirectly, with one another (e.g., via one or more buses).

The receiving component 925 may be configured as or otherwise support a means for receiving, at a memory system from a host system, a command associated with maintenance for the memory system and indicating to initiate collecting values of a parameter of the memory system. In some examples, the receiving component 925 may be configured as or otherwise support a means for receiving, at the memory system from the host system, a second command associated with maintenance for the memory system based at least in part on transmitting the message, the second command indicating to output the value of the parameter of the memory system. In some cases, the receiving component 925 may be configured as or otherwise support a means for receiving, at the memory system from the host system, a third command associated with maintenance for the memory system based at least in part on transmitting the value of the parameter, the third command indicating to terminate collecting values of the parameter of the memory system. In some instances, the receiving component 925 may be configured as or otherwise support a means for receiving, at the memory system, a second command associated with outputting an event record to the host system, where transmitting the message indicating availability of the value of the parameter is based at least in part on receiving the second command.

The storage component 930 may be configured as or otherwise support a means for storing, at the memory system, a value of the parameter based at least in part on determining an event associated with the parameter. In some cases, the storage component 930 may store the value after an event that corresponds to a change in the parameter, an operation associated with the parameter, or an expiration of a time period. In some instances, the parameter is associated with a memory system controller, a performance metric of the memory system, a reliability metric of the memory system, or any combination thereof.

The transmitting component 935 may be configured as or otherwise support a means for transmitting, to the host system, a message indicating an availability of the value of the parameter based at least in part on storing the value of the parameter. In some examples, the transmitting component 935 may be configured as or otherwise support a means for transmitting, to the host system, the value of the parameter based at least in part on receiving the second command. In some cases, the transmitting component 935 may be configured as or otherwise support a means for refraining, at the memory system, from collecting values of the parameter of the memory system based at least in part on receiving the third command. In some examples, transmitting the message by the transmitting component 935 further includes sending an interrupt signal to a processing unit of the host system. In some cases, transmitting the message by the transmitting component 935 further includes setting a flag in a firmware interrupt payload to a processing unit of the host system.

In some instances, the operation component 940 may be configured as or otherwise support a means for determining, at the memory system, that the command is associated with maintenance for the memory system based at least in part on a first portion of the command. In some cases, the operation component 940 may be configured as or otherwise support a means for determining, at the memory system, a type of maintenance associated with the command based at least in part on a second portion of the command, where the type of maintenance is selected from a plurality of types of maintenance by the second portion of the command, the plurality of types of maintenance including collecting values of one or more parameters. In some examples, the operation component 940 may be configured as or otherwise support a means for reading a third portion of the command indicating a method for the type of maintenance associated with the command, the method corresponding to the initiating collecting values.

Figure 10:
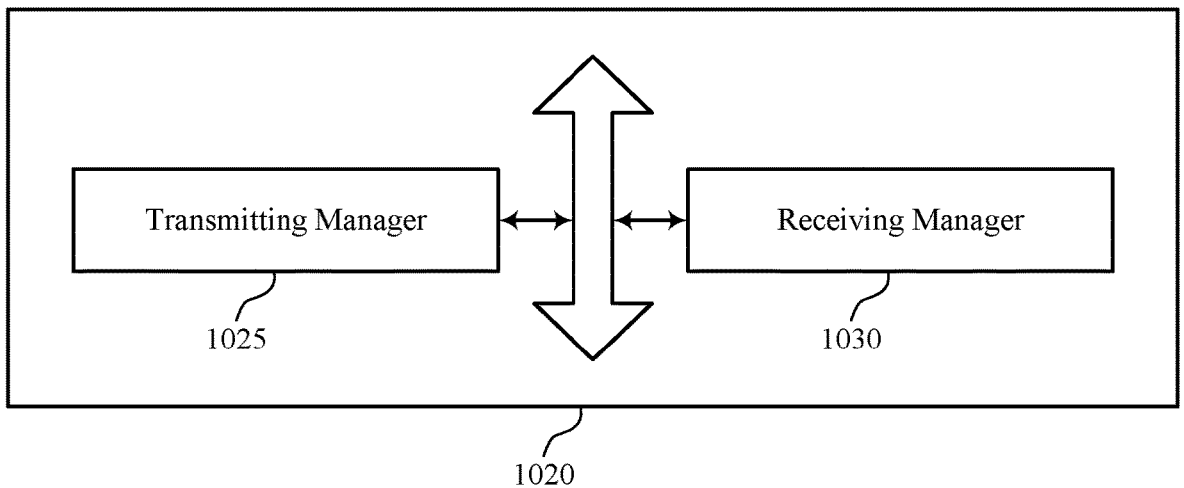
FIG. 10 shows a block diagram of a host system that supports log management maintenance operation and command in accordance with examples as disclosed herein.

FIG. 10 shows a block diagram 1000 of a host system 1020 that supports log management maintenance operation and command in accordance with examples as disclosed herein. The host system 1020 may be an example of aspects of a host system as described with reference to FIGS. 1 through 8. The host system 1020, or various components thereof, may be an example of means for performing various aspects of log management maintenance operation and command as described herein. For example, the host system 1020 may include a transmitting manager 1025 a receiving manager 1030, or any combination thereof. Each of these components may communicate, directly or indirectly, with one another (e.g., via one or more buses).

The transmitting manager 1025 may be configured as or otherwise support a means for transmitting, from a host system to a memory system, a first command associated with maintenance for the memory system and indicating to initiate collecting values of a parameter of the memory system. In some examples, the transmitting manager 1025 may be configured as or otherwise support a means for transmitting, from the host system to the memory system, a second command to obtain the value of the parameter based at least in part on receiving the indication of the availability of the value of the parameter. In some examples, the transmitting manager 1025 may be configured as or otherwise support a means for transmitting, from the host system to the memory system, a third command associated with maintenance for the memory system based at least in part on transmitting the value of the parameter, the third command indicating to terminate collecting values of the parameter of the memory system. In some examples, the transmitting manager 1025 may be configured as or otherwise support a means for receiving, from the memory system, an indication of a termination of collecting values of the parameter of the memory system based at least in part on transmitting the third command. In some cases, the first command transmitted by transmitting manager 1025 includes a type of maintenance selected from a plurality of types of maintenance and a method of the type of maintenance selected from a plurality of methods for the type of maintenance. In some examples, the parameter is associated with a memory system controller, a performance metric of the memory system, a reliability metric of the memory system, or any combination thereof.

The receiving manager 1030 may be configured as or otherwise support a means for receiving, at the host system from the memory system, an indication of an availability of a value of the parameter. In some examples, the receiving manager 1030 may be configured as or otherwise support a means for receiving, from the memory system, a message including the value of the parameter based at least in part on transmitting the second command to the memory system.

Figure 11:
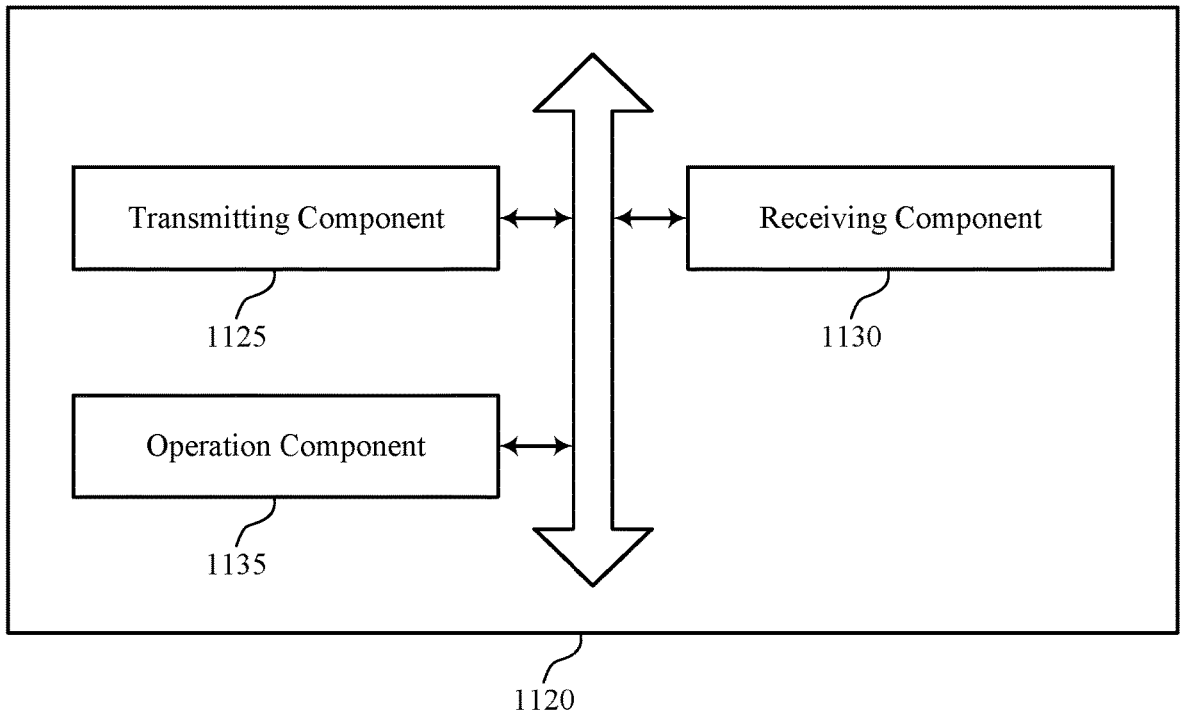
FIG. 11 shows a block diagram of a memory system that supports log management maintenance operation and command in accordance with examples as disclosed herein.

FIG. 11 shows a block diagram 1100 of a memory system 1120 that supports log management maintenance operation and command in accordance with examples as disclosed herein. The memory system 1120 may be an example of aspects of a memory system as described with reference to FIGS. 1 through 8. The memory system 1120, or various components thereof, may be an example of means for performing various aspects of log management maintenance operation and command as described herein. For example, the memory system 1120 may include a transmitting component 1125, a receiving component 1130, an operation component 1135, or any combination thereof. Each of these components may communicate, directly or indirectly, with one another (e.g., via one or more buses).

The transmitting component 1125 may be configured as or otherwise support a means for transmitting, from a memory system to a host system, a message indicating that a quantity of errors for an address of an address space associated with the memory system satisfies a threshold.

The receiving component 1130 may be configured as or otherwise support a means for receiving, from the host system, a command associated with maintenance for the memory system and indicating a retirement of the address for the address space associated with the memory system based at least in part on transmitting the message. In some examples, the quantity of errors received by the receiving component 1130 is associated with one or more correctable errors at the address. In some examples, the receiving component 1130 may be configured as or otherwise support a means for receiving the threshold from the host system.

In some examples, the receiving component 1130 may be configured as or otherwise support a means for receiving, at the memory system, a second command associated with outputting an event record to the host system, where transmitting the message indicating that the quantity of errors satisfy the threshold is based at least in part on receiving the second command. In some examples, the quantity of errors received by the receiving component 1130 is associated with one or more uncorrectable errors at the address. In some examples, the threshold is a single error.

The operation component 1135 may be configured as or otherwise support a means for retiring the address for the address space associated with the memory system based at least in part on receiving the command. In some examples, to support retiring the address for the address space associated with the memory system, the operation component 1135 may be configured as or otherwise support a means for refraining from performing a management operation on the address. In some examples, to support retiring the address for the address space associated with the memory system, the operation component 1135 may be configured as or otherwise support a means for refraining from monitoring the quantity of errors at the address for an access command of the address.

Figure 12:
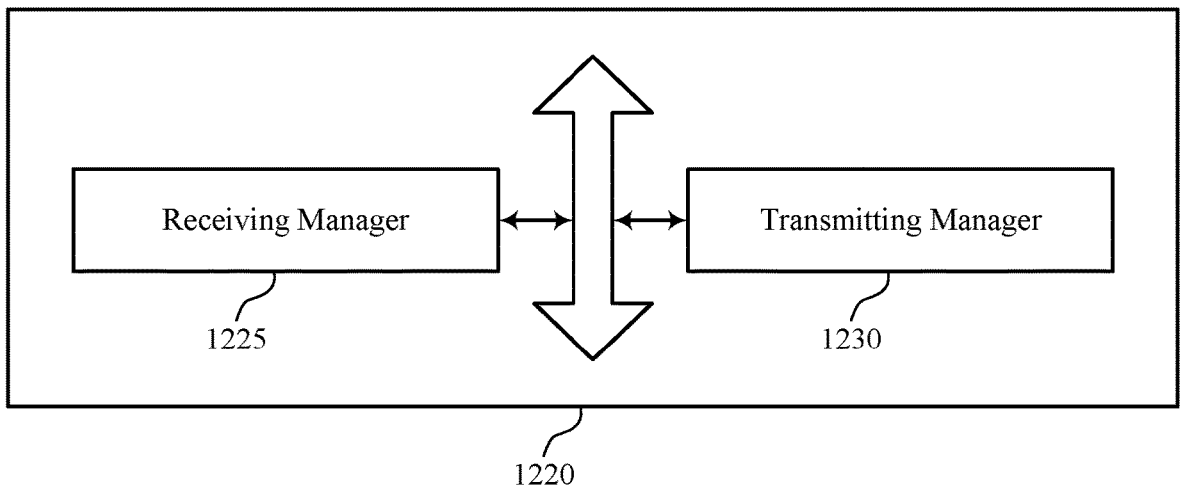
FIG. 12 shows a block diagram of a host system that supports log management maintenance operation and command in accordance with examples as disclosed herein.

FIG. 12 shows a block diagram 1200 of a host system 1220 that supports log management maintenance operation and command in accordance with examples as disclosed herein. The host system 1220 may be an example of aspects of a host system as described with reference to FIGS. 1 through 8. The host system 1220, or various components thereof, may be an example of means for performing various aspects of log management maintenance operation and command as described herein. For example, the host system 1220 may include a receiving manager 1225 a transmitting manager 1230, or any combination thereof. Each of these components may communicate, directly or indirectly, with one another (e.g., via one or more buses).

The receiving manager 1225 may be configured as or otherwise support a means for receiving, at a host system from a memory system, a message indicating that a quantity of errors of an address in an address space associated with the memory system satisfies a threshold. In some examples, the receiving manager 1225 may be configured as or otherwise support a means for receiving, at the host system from the memory system, an indication that the address is retired based at least in part on transmitting the command.

The transmitting manager 1230 may be configured as or otherwise support a means for transmitting, from the host system to the memory system, a command to perform a maintenance operation associated with retiring the address in the address space based at least in part on transmitting the message. In some examples, the transmitting manager 1230 may be configured as or otherwise support a means for transmitting the threshold to the memory system. In some examples, the transmitting manager 1230 may be configured as or otherwise support a means for transmitting a second command associated with outputting data to the host system, where receiving the message indicating the quantity of errors over the threshold is based at least in part on transmitting the second command. In some examples, the command transmitted by the transmitting manager 1230 further indicates to the memory system to refrain from performing a management operation on the address.

In some examples, the command transmitted by the transmitting manager 1230 further indicates to the memory system to refrain from monitoring the quantity of errors at the address for an access command of the address. In some examples, the quantity of errors is associated with one or more uncorrectable errors at the address. In some examples, the threshold is a single error. In some examples, the quantity of errors is associated with one or more correctable errors at the address.

Figure 13:
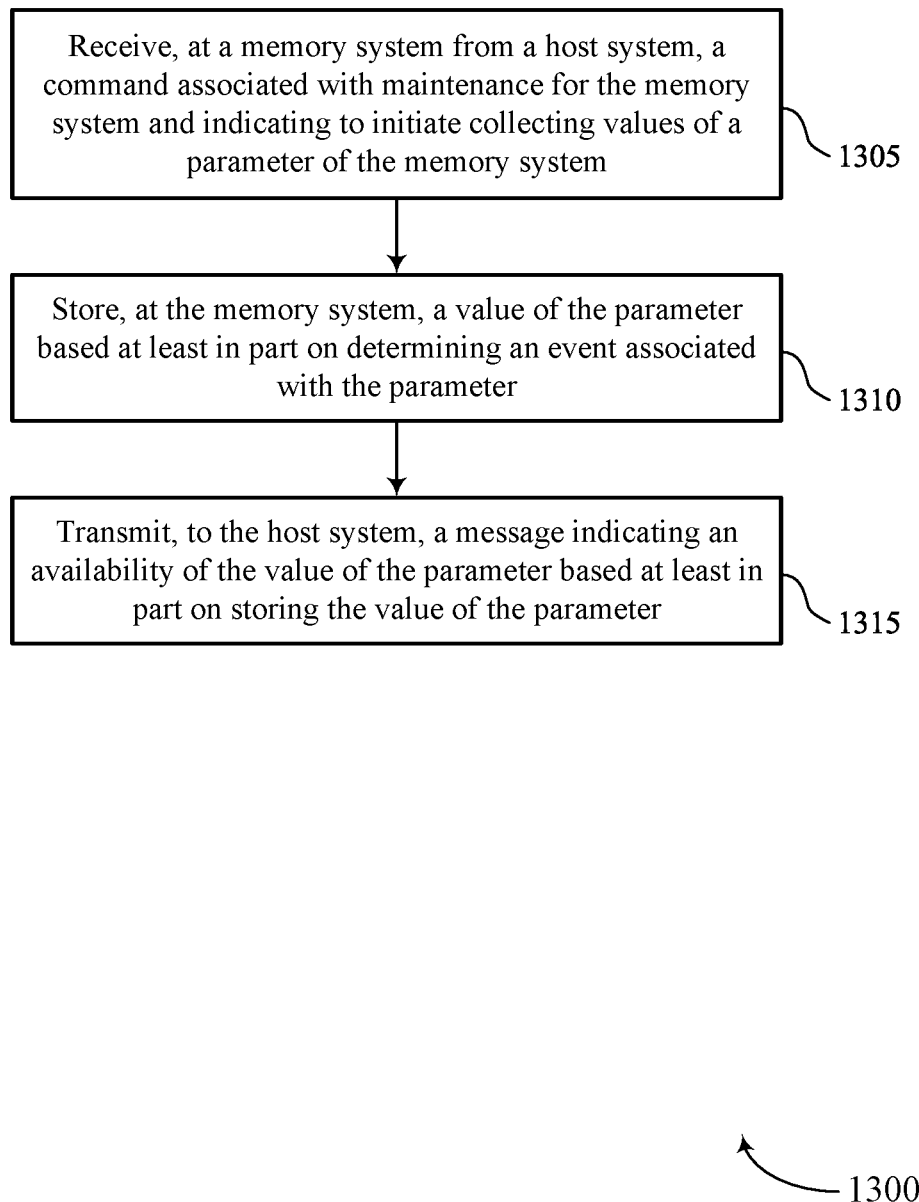
FIGS. 13 through 16 show flowcharts illustrating a method or methods that support log management maintenance operation and command in accordance with examples as disclosed herein.

FIG. 13 shows a flowchart illustrating a method 1300 that supports log management maintenance operation and command in accordance with examples as disclosed herein. The operations of method 1300 may be implemented by a memory system or its components as described herein. For example, the operations of method 1300 may be performed by a memory system as described with reference to FIGS. 1 through 9. In some examples, a memory system may execute a set of instructions to control the functional elements of the device to perform the described functions. Additionally or alternatively, the memory system may perform aspects of the described functions using special-purpose hardware.

At 1305, the method may include receiving, at a memory system from a host system, a command associated with maintenance for the memory system and indicating to initiate collecting values of a parameter of the memory system. The operations of 1305 may be performed in accordance with examples as disclosed herein. In some examples, aspects of the operations of 1305 may be performed by a receiving component 925 as described with reference to FIG. 9.

At 1310, the method may include storing, at the memory system, a value of the parameter based at least in part on determining an event associated with the parameter. The operations of 1310 may be performed in accordance with examples as disclosed herein. In some examples, aspects of the operations of 1310 may be performed by a storage component 930 as described with reference to FIG. 9.

At 1315, the method may include transmitting, to the host system, a message indicating an availability of the value of the parameter based at least in part on storing the value of the parameter. The operations of 1315 may be performed in accordance with examples as disclosed herein. In some examples, aspects of the operations of 1315 may be performed by a transmitting component 935 as described with reference to FIG. 9.

In some examples, an apparatus as described herein may perform a method or methods, such as the method 1300. The apparatus may include, features, circuitry, logic, means, or instructions (e.g., a non-transitory computer-readable medium storing instructions executable by a processor) for receiving, at a memory system from a host system, a command associated with maintenance for the memory system and indicating to initiate collecting values of a parameter of the memory system, storing, at the memory system, a value of the parameter based at least in part on determining an event associated with the parameter, and transmitting, to the host system, a message indicating an availability of the value of the parameter based at least in part on storing the value of the parameter.

Some cases of the method 1300 and the apparatus described herein may further include operations, features, circuitry, logic, means, or instructions for receiving, at the memory system from the host system, a second command associated with maintenance for the memory system based at least in part on transmitting the message, the second command indicating to output the value of the parameter of the memory system and transmitting, to the host system, the value of the parameter based at least in part on receiving the second command.

Some instances of the method 1300 and the apparatus described herein may further include operations, features, circuitry, logic, means, or instructions for receiving, at the memory system from the host system, a third command associated with maintenance for the memory system based at least in part on transmitting the value of the parameter, the third command indicating to terminate collecting values of the parameter of the memory system and refraining, at the memory system, from collecting values of the parameter of the memory system based at least in part on receiving the third command.

Some examples of the method 1300 and the apparatus described herein may further include operations, features, circuitry, logic, means, or instructions for determining, at the memory system, that the command may be associated with maintenance for the memory system based at least in part on a first portion of the command.

Some cases of the method 1300 and the apparatus described herein may further include operations, features, circuitry, logic, means, or instructions for determining, at the memory system, a type of maintenance associated with the command based at least in part on a second portion of the command, where the type of maintenance may be selected from a plurality of types of maintenance by the second portion of the command, the plurality of types of maintenance including collecting values of one or more parameters and reading a third portion of the command indicating a method for the type of maintenance associated with the command, the method corresponding to the initiating collecting values.

Some instances of the method 1300 and the apparatus described herein may further include operations, features, circuitry, logic, means, or instructions for receiving, at the memory system, a second command associated with outputting an event record to the host system, where transmitting the message indicating availability of the value of the parameter may be based at least in part on receiving the second command.

Some examples of the method 1300 and the apparatus described herein may further include operations, features, circuitry, logic, means, or instructions for transmitting the message further includes sending an interrupt signal to a processing unit of the host system.

Some cases of the method 1300 and the apparatus described herein may further include operations, features, circuitry, logic, means, or instructions for transmitting the message further includes setting a flag in a firmware interrupt payload to a processing unit of the host system.

In some instances of the method 1300 and the apparatus described herein, the parameter may be associated with a memory system controller, a performance metric of the memory system, a reliability metric of the memory system, or any combination thereof.

In some examples of the method 1300 and the apparatus described herein, the event corresponds to a change in the parameter, an operation associated with the parameter, or an expiration of a time period.

Figure 14:
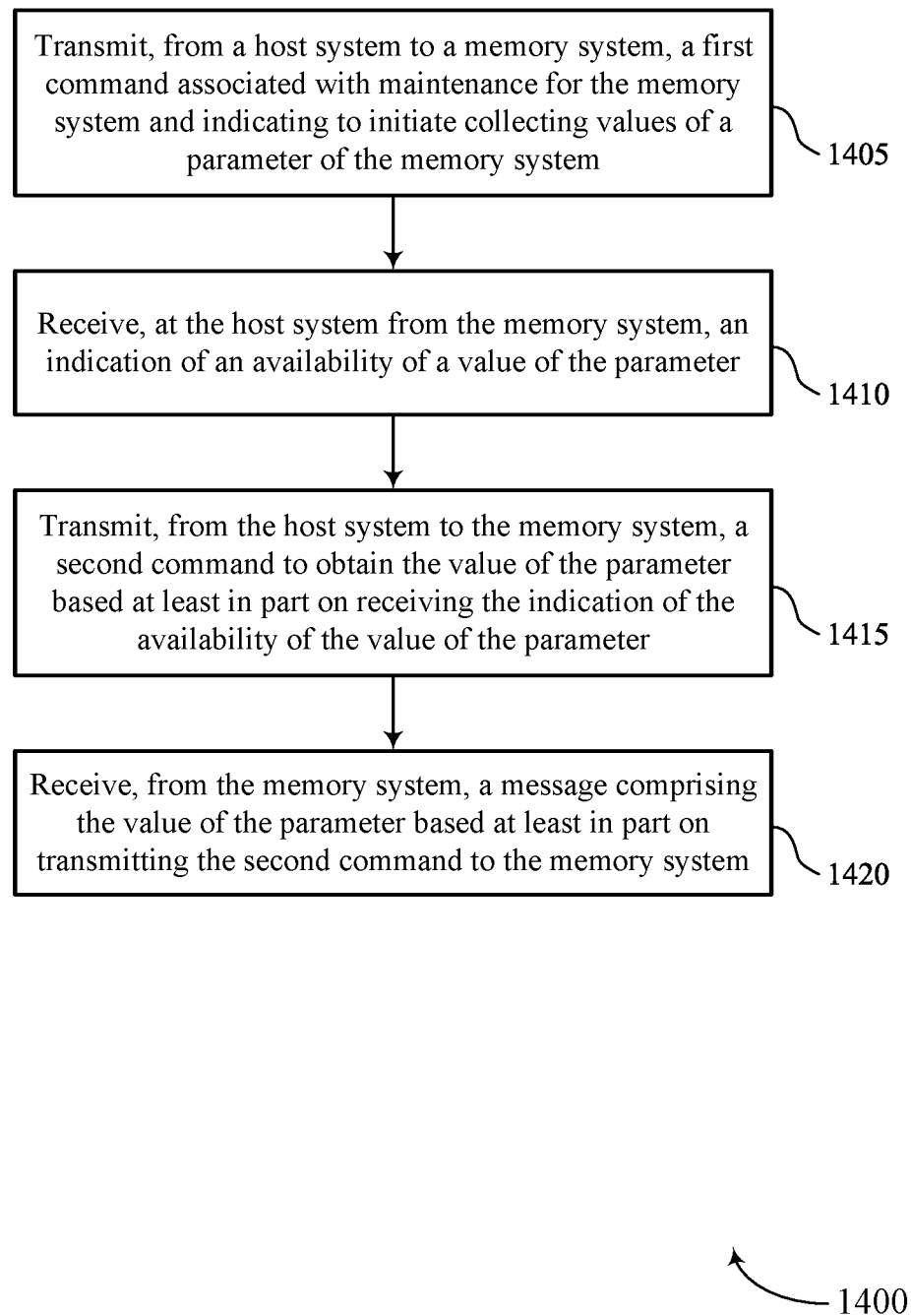

FIG. 14 shows a flowchart illustrating a method 1400 that supports log management maintenance operation and command in accordance with examples as disclosed herein. The operations of method 1400 may be implemented by a host system or its components as described herein. For example, the operations of method 1400 may be performed by a host system as described with reference to FIGS. 1 through 8 and 10. In some examples, a host system may execute a set of instructions to control the functional elements of the device to perform the described functions. Additionally or alternatively, the host system may perform aspects of the described functions using special-purpose hardware.

At 1405, the method may include transmitting, from a host system to a memory system, a first command associated with maintenance for the memory system and indicating to initiate collecting values of a parameter of the memory system. The operations of 1405 may be performed in accordance with examples as disclosed herein. In some examples, aspects of the operations of 1405 may be performed by a transmitting manager 1025 as described with reference to FIG. 10.

At 1410, the method may include receiving, at the host system from the memory system, an indication of an availability of a value of the parameter. The operations of 1410 may be performed in accordance with examples as disclosed herein. In some examples, aspects of the operations of 1410 may be performed by a receiving manager 1030 as described with reference to FIG. 10.

At 1415, the method may include transmitting, from the host system to the memory system, a second command to obtain the value of the parameter based at least in part on receiving the indication of the availability of the value of the parameter. The operations of 1415 may be performed in accordance with examples as disclosed herein. In some examples, aspects of the operations of 1415 may be performed by a transmitting manager 1025 as described with reference to FIG. 10.

At 1420, the method may include receiving, from the memory system, a message including the value of the parameter based at least in part on transmitting the second command to the memory system. The operations of 1420 may be performed in accordance with examples as disclosed herein. In some examples, aspects of the operations of 1420 may be performed by a receiving manager 1030 as described with reference to FIG. 10.

In some examples, an apparatus as described herein may perform a method or methods, such as the method 1400. The apparatus may include, features, circuitry, logic, means, or instructions (e.g., a non-transitory computer-readable medium storing instructions executable by a processor) for transmitting, from a host system to a memory system, a first command associated with maintenance for the memory system and indicating to initiate collecting values of a parameter of the memory system, receiving, at the host system from the memory system, an indication of an availability of a value of the parameter, transmitting, from the host system to the memory system, a second command to obtain the value of the parameter based at least in part on receiving the indication of the availability of the value of the parameter, and receiving, from the memory system, a message including the value of the parameter based at least in part on transmitting the second command to the memory system.

Some instances of the method 1400 and the apparatus described herein may further include operations, features, circuitry, logic, means, or instructions for transmitting, from the host system to the memory system, a third command associated with maintenance for the memory system based at least in part on transmitting the value of the parameter, the third command indicating to terminate collecting values of the parameter of the memory system and receiving, from the memory system, an indication of a termination of collecting values of the parameter of the memory system based at least in part on transmitting the third command.

In some cases of the method 1400 and the apparatus described herein, the first command includes a type of maintenance selected from a plurality of types of maintenance and a method of the type of maintenance selected from a plurality of methods for the type of maintenance.

In some instances of the method 1400 and the apparatus described herein, the parameter may be associated with a memory system controller, a performance metric of the memory system, a reliability metric of the memory system, or any combination thereof.

Figure 15:
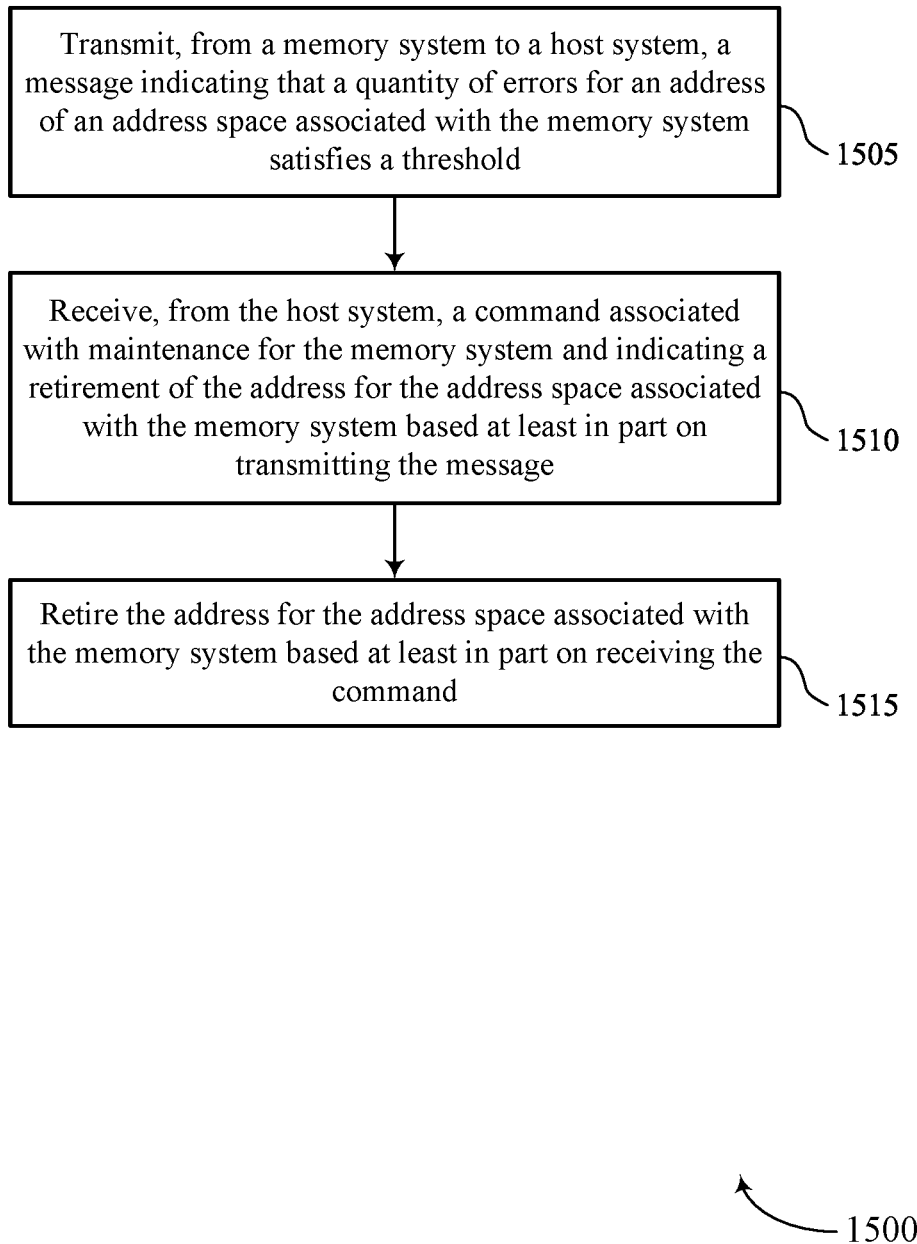

FIG. 15 shows a flowchart illustrating a method 1500 that supports log management maintenance operation and command in accordance with examples as disclosed herein. The operations of method 1500 may be implemented by a memory system or its components as described herein. For example, the operations of method 1500 may be performed by a memory system as described with reference to FIGS. 1 through 8 and 11. In some examples, a memory system may execute a set of instructions to control the functional elements of the device to perform the described functions. Additionally or alternatively, the memory system may perform aspects of the described functions using special-purpose hardware.

At 1505, the method may include transmitting, from a memory system to a host system, a message indicating that a quantity of errors for an address of an address space associated with the memory system satisfies a threshold. The operations of 1505 may be performed in accordance with examples as disclosed herein. In some examples, aspects of the operations of 1505 may be performed by a transmitting component 1125 as described with reference to FIG. 11.

At 1510, the method may include receiving, from the host system, a command associated with maintenance for the memory system and indicating a retirement of the address for the address space associated with the memory system based at least in part on transmitting the message. The operations of 1510 may be performed in accordance with examples as disclosed herein. In some examples, aspects of the operations of 1510 may be performed by a receiving component 1130 as described with reference to FIG. 11.

At 1515, the method may include retiring the address for the address space associated with the memory system based at least in part on receiving the command. The operations of 1515 may be performed in accordance with examples as disclosed herein. In some examples, aspects of the operations of 1515 may be performed by an operation component 1135 as described with reference to FIG. 11.

In some cases, an apparatus as described herein may perform a method or methods, such as the method 1500. The apparatus may include, features, circuitry, logic, means, or instructions (e.g., a non-transitory computer-readable medium storing instructions executable by a processor) for transmitting, from a memory system to a host system, a message indicating that a quantity of errors for an address of an address space associated with the memory system satisfies a threshold, receiving, from the host system, a command associated with maintenance for the memory system and indicating a retirement of the address for the address space associated with the memory system based at least in part on transmitting the message, and retiring the address for the address space associated with the memory system based at least in part on receiving the command.

In some instances of the method 1500 and the apparatus described herein, retiring the address for the address space associated with the memory system may include operations, features, circuitry, logic, means, or instructions for refraining from performing a management operation on the address.

In some examples of the method 1500 and the apparatus described herein, retiring the address for the address space associated with the memory system may include operations, features, circuitry, logic, means, or instructions for refraining from monitoring the quantity of errors at the address for an access command of the address.

In some cases of the method 1500 and the apparatus described herein, the quantity of errors may be associated with one or more uncorrectable errors at the address.

In some instances of the method 1500 and the apparatus described herein, the threshold may be a single error.

In some examples of the method 1500 and the apparatus described herein, the quantity of errors may be associated with one or more correctable errors at the address.

Some instances of the method 1500 and the apparatus described herein may further include operations, features, circuitry, logic, means, or instructions for receiving the threshold from the host system.

Some cases of the method 1500 and the apparatus described herein may further include operations, features, circuitry, logic, means, or instructions for receiving, at the memory system, a second command associated with outputting an event record to the host system, where transmitting the message indicating that the quantity of errors satisfy the threshold may be based at least in part on receiving the second command.

Figure 16:
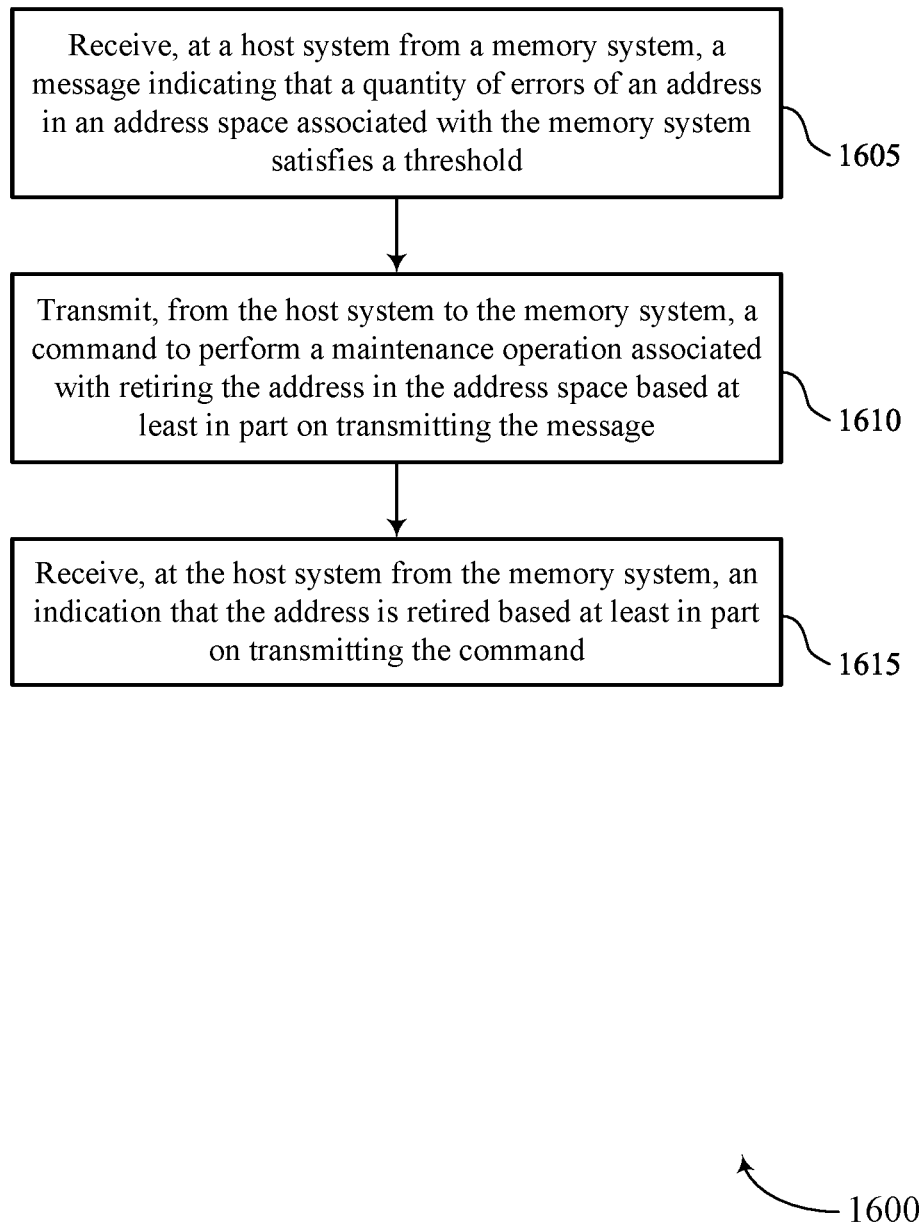

FIG. 16 shows a flowchart illustrating a method 1600 that supports log management maintenance operation and command in accordance with examples as disclosed herein. The operations of method 1600 may be implemented by a host system or its components as described herein. For example, the operations of method 1600 may be performed by a host system as described with reference to FIGS. 1 through 8 and 12. In some examples, a host system may execute a set of instructions to control the functional elements of the device to perform the described functions. Additionally or alternatively, the host system may perform aspects of the described functions using special-purpose hardware.

At 1605, the method may include receiving, at a host system from a memory system, a message indicating that a quantity of errors of an address in an address space associated with the memory system satisfies a threshold. The operations of 1605 may be performed in accordance with examples as disclosed herein. In some examples, aspects of the operations of 1605 may be performed by a receiving manager 1225 as described with reference to FIG. 12.

At 1610, the method may include transmitting, from the host system to the memory system, a command to perform a maintenance operation associated with retiring the address in the address space based at least in part on transmitting the message. The operations of 1610 may be performed in accordance with examples as disclosed herein. In some examples, aspects of the operations of 1610 may be performed by a transmitting manager 1230 as described with reference to FIG. 12.

At 1615, the method may include receiving, at the host system from the memory system, an indication that the address is retired based at least in part on transmitting the command. The operations of 1615 may be performed in accordance with examples as disclosed herein. In some examples, aspects of the operations of 1615 may be performed by a receiving manager 1225 as described with reference to FIG. 12.

In some examples, an apparatus as described herein may perform a method or methods, such as the method 1600. The apparatus may include, features, circuitry, logic, means, or instructions (e.g., a non-transitory computer-readable medium storing instructions executable by a processor) for receiving, at a host system from a memory system, a message indicating that a quantity of errors of an address in an address space associated with the memory system satisfies a threshold, transmitting, from the host system to the memory system, a command to perform a maintenance operation associated with retiring the address in the address space based at least in part on transmitting the message, and receiving, at the host system from the memory system, an indication that the address is retired based at least in part on transmitting the command.

In some cases of the method 1600 and the apparatus described herein, the command further indicates to the memory system to refrain from performing a management operation on the address.

In some instances of the method 1600 and the apparatus described herein, the command further indicates to the memory system to refrain from monitoring the quantity of errors at the address for an access command of the address.

In some examples of the method 1600 and the apparatus described herein, the quantity of errors may be associated with one or more uncorrectable errors at the address.

In some instances of the method 1600 and the apparatus described herein, the threshold may be a single error.

In some cases of the method 1600 and the apparatus described herein, the quantity of errors may be associated with one or more correctable errors at the address.

Some examples of the method 1600 and the apparatus described herein may further include operations, features, circuitry, logic, means, or instructions for transmitting the threshold to the memory system.

Some instances of the method 1600 and the apparatus described herein may further include operations, features, circuitry, logic, means, or instructions for transmitting a second command associated with outputting data to the host system, where receiving the message indicating the quantity of errors over the threshold may be based at least in part on transmitting the second command.

It should be noted that the methods described herein describe possible implementations, and that the operations and the steps may be rearranged or otherwise modified and that other implementations are possible. Further, portions from two or more of the methods may be combined.

Another apparatus is described. The apparatus may include a memory system including a plurality of memory devices, a controller coupled with the plurality of memory devices and configured to cause the apparatus to, receive, from a host system, a command associated with maintenance for the memory system and indicating to initiate collecting values of a parameter of the memory system, store, at the memory system, a value of the parameter based at least in part on determining an event associated with the parameter, and transmit, to the host system, a message indicating an availability of the value of the parameter based at least in part on storing the value of the parameter.

In some examples, the controller may be further configurable to receive, from the host system, a second command associated with maintenance for the memory system based at least in part on transmitting the message, the second command indicating to output the value of the parameter of the memory system and transmit, to the host system, the value of the parameter based at least in part on receiving the second command.

In some examples, the controller may be further configurable to receive, from the host system, a third command associated with maintenance for the memory system based at least in part on transmitting the value of the parameter, the third command indicating to terminate collecting values of the parameter of the memory system and refrain from collecting values of the parameter of the memory system based at least in part on receiving the third command.

In some examples, the controller may be further configurable to determine that the command may be associated with maintenance for the memory system based at least in part on a first portion of the command.

In some examples of the apparatus, the controller may be further configured to cause the apparatus to determiner a type of maintenance associated with the command may be selected from a plurality of types of maintenance by a second portion of the command and read a third portion of the command indicating a method for the type of maintenance associated with the command.

In some examples, the controller may be further configurable to receive a second command associated with outputting an event record to the host system, where transmitting the message indicating availability of the value of the parameter may be based at least in part on receiving the second command.

In some examples of the apparatus, the controller may be further configurable to transmit the message the controller may be configured to cause the apparatus to send an interrupt signal to a processing unit of the host system.

In some examples of the apparatus, the controller may be further configurable to transmit the message the controller may be configured to cause the apparatus to set a flag in a firmware interrupt payload to a processing unit of the host system.

In some examples of the apparatus, the parameter may be associated with the controller, a performance metric of the memory system, a reliability metric of the memory system, or any combination thereof.

Another apparatus is described. The apparatus may include a memory system including a plurality of memory devices, a controller coupled with the plurality of memory devices and configured to cause the apparatus to, transmit, to a host system, a message indicating that a quantity of errors for an address of an address space associated with the memory system satisfies a threshold, receive, from the host system, a command associated with maintenance for the memory system and indicating retirement of the address for the address space associated with the memory system based at least in part on transmitting the message, and retire the address for the address space associated with the memory system based at least in part on receiving the command.

In some examples, the controller may be further configurable to refrain from performing a management operation on the address.

In some examples, the controller may be further configurable to refrain from monitoring the quantity of errors at the address for an access command of the address.

In some examples of the apparatus, the quantity of errors may be associated with one or more uncorrectable errors at the address.

In some examples of the apparatus, the threshold may be a single error.

In some examples of the apparatus, the quantity of errors may be associated with one or more correctable errors at the address.

In some examples, the controller may be further configurable to receive the threshold from the host system.

In some examples, the controller may be further configurable to receive a second command associated with outputting an event record to the host system, where transmitting the message indicating the quantity of errors over the threshold may be based at least in part on receiving the second command.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a memory system from a host system, a first command associated with maintenance for the memory system and indicating to initiate collecting values of a parameter of the memory system, wherein the first command comprises a type of maintenance selected from a plurality of types of maintenance and a method of the type of maintenance selected from a plurality of methods of the type of maintenance;
   storing, at the memory system, a value of the parameter based at least in part on determining an event associated with the parameter;
   transmitting, to the host system, a first message indicating an availability of the value of the parameter based at least in part on storing the value of the parameter;
   receiving, at the memory system from the host system, a second command to obtain the value of the parameter based at least in part on transmitting the first message; and
   transmitting, to the host system, a second message comprising the value of the parameter based at least in part on receiving the second command.

2. The method of claim 1, further comprising:
   receiving, at the memory system from the host system, a third command associated with maintenance for the memory system based at least in part on transmitting the second message, the third command indicating to terminate collecting the value of the parameter of the memory system; and
   refraining, at the memory system, from collecting the value of the parameter of the memory system based at least in part on receiving the third command.

3. The method of claim 1, further comprising:
   determining, at the memory system, that the first command is associated with maintenance for the memory system based at least in part on a first portion of the first command.

4. The method of claim 3, wherein a second portion of the first command comprises the type of maintenance and a third portion of the first command comprises the method of the type of maintenance, the method further comprising:
   determining, at the memory system, the type of maintenance associated with the first command based at least in part on the second portion of the first command; and
   determining the method of the type of maintenance associated with the first command based at least in part on the third portion of the first command.

5. The method of claim 1, wherein the second command is associated with outputting an event record to the host system.

6. The method of claim 1, wherein transmitting the first message comprises:
   sending an interrupt signal to a processing unit of the host system.

7. The method of claim 1, wherein transmitting the first message comprises:
   setting a flag in a firmware interrupt payload to a processing unit of the host system.

8. The method of claim 1, wherein the parameter is associated with a memory system controller, a performance metric of the memory system, a reliability metric of the memory system, or any combination thereof.

9. The method of claim 1, wherein the event corresponds to a change in the parameter, an operation associated with the parameter, or an expiration of a time period.

10. A memory system, comprising:
    one or more memory devices; and
    one or more controllers coupled with the one or more memory devices and configured to cause the memory system to:
    receive, from a host system, a first command associated with maintenance for the memory system and indicating to initiate collecting values of a parameter of the memory system, wherein the first command comprises a type of maintenance selected from a plurality of types of maintenance and a method of the type of maintenance selected from a plurality of methods of the type of maintenance;
    store, at the memory system, a value of the parameter based at least in part on determining an event associated with the parameter;
    transmit, to the host system, a first message indicating an availability of the value of the parameter based at least in part on storing the value of the parameter;
    receive, at the memory system from the host system, a second command to obtain the value of the parameter based at least in part on transmitting the first message; and
    transmit, to the host system, a second message comprising the value of the parameter based at least in part on receiving the second command.

11. The memory system of claim 10, wherein the one or more controllers are further configured to cause the memory system to:
    receive, from the host system, a third command associated with maintenance for the memory system based at least in part on transmitting the second message, the third command indicating to terminate collecting the value of the parameter of the memory system; and
    refrain from collecting the value of the parameter of the memory system based at least in part on receiving the third command.

12. The memory system of claim 10, wherein the one or more controllers are further configured to cause the memory system to:
    determine that the first command is associated with maintenance for the memory system based at least in part on a first portion of the first command.

13. The memory system of claim 12, wherein a second portion of the first command comprises the type of maintenance and a third portion of the first command comprises the method of the type of maintenance, and wherein the one or more controllers are further configured to cause the memory system to:
    determine the type of maintenance associated with the first command based at least in part on the second portion of the first command; and determine the method of the type of maintenance associated with the first command based at least in part on the third portion of the first command.

14. The memory system of claim 10, wherein the second command is associated with outputting an event record to the host system.

15. The memory system of claim 10, wherein, to transmit the first message, the one or more controllers are configured to cause the memory system to:
send an interrupt signal to a processing unit of the host system.

16. The memory system of claim 10, wherein, to transmit the first message, the one or more controllers are configured to cause the memory system to:
set a flag in a firmware interrupt payload to a processing unit of the host system.

17. The memory system of claim 10, wherein the parameter is associated with the one or more controllers, a performance metric of the memory system, a reliability metric of the memory system, or any combination thereof.

18. A method, comprising:
selecting a type of maintenance from a plurality of types of maintenance and a method of the type of maintenance from a plurality of method of the type of maintenance;
transmitting, from a host system to a memory system, a first command associated with maintenance for the memory system and indicating to initiate collecting values of a parameter of the memory system, wherein the first command comprises the selected type of maintenance and the selected method of the type of maintenance;
receiving, at the host system from the memory system, an indication of an availability of a value of the parameter;
transmitting, from the host system to the memory system, a second command to obtain the value of the parameter based at least in part on receiving the indication of the availability of the value of the parameter; and
receiving, from the memory system, a message comprising the value of the parameter based at least in part on transmitting the second command to the memory system.

19. The method of claim 18, further comprising:
transmitting, from the host system to the memory system, a third command associated with maintenance for the memory system based at least in part on receiving the message, the third command indicating to terminate collecting the value of the parameter of the memory system; and receiving, from the memory system, an indication of a termination of collecting the value of the parameter of the memory system based at least in part on transmitting the third command.

20. The method of claim 18, wherein the parameter is associated with a memory system controller, a performance metric of the memory system, a reliability metric of the memory system, or any combination thereof.

21. A host system, comprising:
one or more controllers configured to cause the host system to:
select a type of maintenance from a plurality of types of maintenance and a method of the type of maintenance from a plurality of method of the type of maintenance;
transmit, to a memory system, a first command associated with maintenance for the memory system and indicating to initiate collecting values of a parameter of the memory system, wherein the first command comprises the selected type of maintenance and the selected method of the type of maintenance;
receive, from the memory system, an indication of an availability of a value of the parameter;
transmit, to the memory system, a second command to obtain the value of the parameter based at least in part on receiving the indication of the availability of the value of the parameter; and
receive, from the memory system, a message comprising the value of the parameter based at least in part on transmitting the second command to the memory system.

22. The host system of claim 21, wherein the one or more controllers are further configured to cause the host system to:
transmit, to the memory system, a third command associated with maintenance for the memory system based at least in part on receiving the message, the third command indicating to terminate collecting the value of the parameter of the memory system; and
receive, from the memory system, an indication of a termination of collecting the value of the parameter of the memory system based at least in part on transmitting the third command.

23. The host system of claim 21, wherein the parameter is associated with a memory system controller, a performance metric of the memory system, a reliability metric of the memory system, or any combination thereof.

* * * * *